US005428694A

United States Patent [19]

Betts et al.

[11] Patent Number: 5,428,694

[45] Date of Patent: Jun. 27, 1995

[54] DATA PROCESSING SYSTEM AND METHOD FOR FORMS DEFINITION, RECOGNITION AND VERIFICATION OF SCANNED IMAGES OF DOCUMENT FORMS

[75] Inventors: Timothy S. Betts, Germantown; Valerie M. Carras, Kensington, both of Md.

[73] Assignee: International Business Machines Corporation, Armonk, N.Y.

[21] Appl. No.: 136,643

[22] Filed: Oct. 14, 1993

[51] Int. Cl.[6] .................................... G06K 9/20

[52] U.S. Cl. .................................... 382/317; 395/149

[58] Field of Search .................... 382/61, 57; 395/148, 395/149; 235/462

[56] References Cited

U.S. PATENT DOCUMENTS

| | | | |
|---|---|---|---|
| 4,503,556 | 3/1985 | Scherl et al. | 382/9 |
| 4,533,959 | 8/1985 | Sakurai | 382/61 |
| 4,616,854 | 10/1986 | Landrum et al. | 283/74 |
| 4,741,045 | 4/1988 | Denning | 382/9 |
| 4,748,678 | 5/1988 | Takeda et al. | 382/61 |
| 4,813,077 | 3/1989 | Woods et al. | 382/61 |
| 4,933,979 | 6/1990 | Suzuki et al. | 382/61 |
| 4,933,984 | 6/1990 | Nakano et al. | 382/61 |
| 4,949,392 | 8/1990 | Barski et al. | 382/61 |
| 4,992,650 | 2/1991 | Somerville | 235/462 |
| 5,010,580 | 4/1991 | Vincent et al. | 382/17 |
| 5,038,392 | 8/1991 | Morris et al. | 382/61 |
| 5,140,650 | 8/1992 | Casey et al. | 382/61 |
| 5,235,654 | 8/1993 | Anderson et al. | 382/61 |

OTHER PUBLICATIONS

R. G. Casey, et al. entitled "Intelligent Forms Processing," *IBM Systems Journal,* vol. 29, No. 3, 1990, pp. 435–450.

*Primary Examiner*—Michael T. Razavi
*Assistant Examiner*—Jon Chang
*Attorney, Agent, or Firm*—Joseph C. Redmond, Jr.; David A. Mims; John E. Hoel

[57] ABSTRACT

An improved forms recognition method and system are disclosed, that minimizes the time required to perform the forms recognition process, by adaptively changing the processing sequence. In accordance with the invention, when new master forms are defined in the system, a new processing template is also defined. The processing template includes tables and indexes that give the profile of all the master forms that have been defined in the system. The processing template is then referred to at the time of forms recognition processing, to adaptively choose which forms recognition operations to perform, to minimize the time required to finish processing a particular completed form.

15 Claims, 30 Drawing Sheets

Figure 2A:
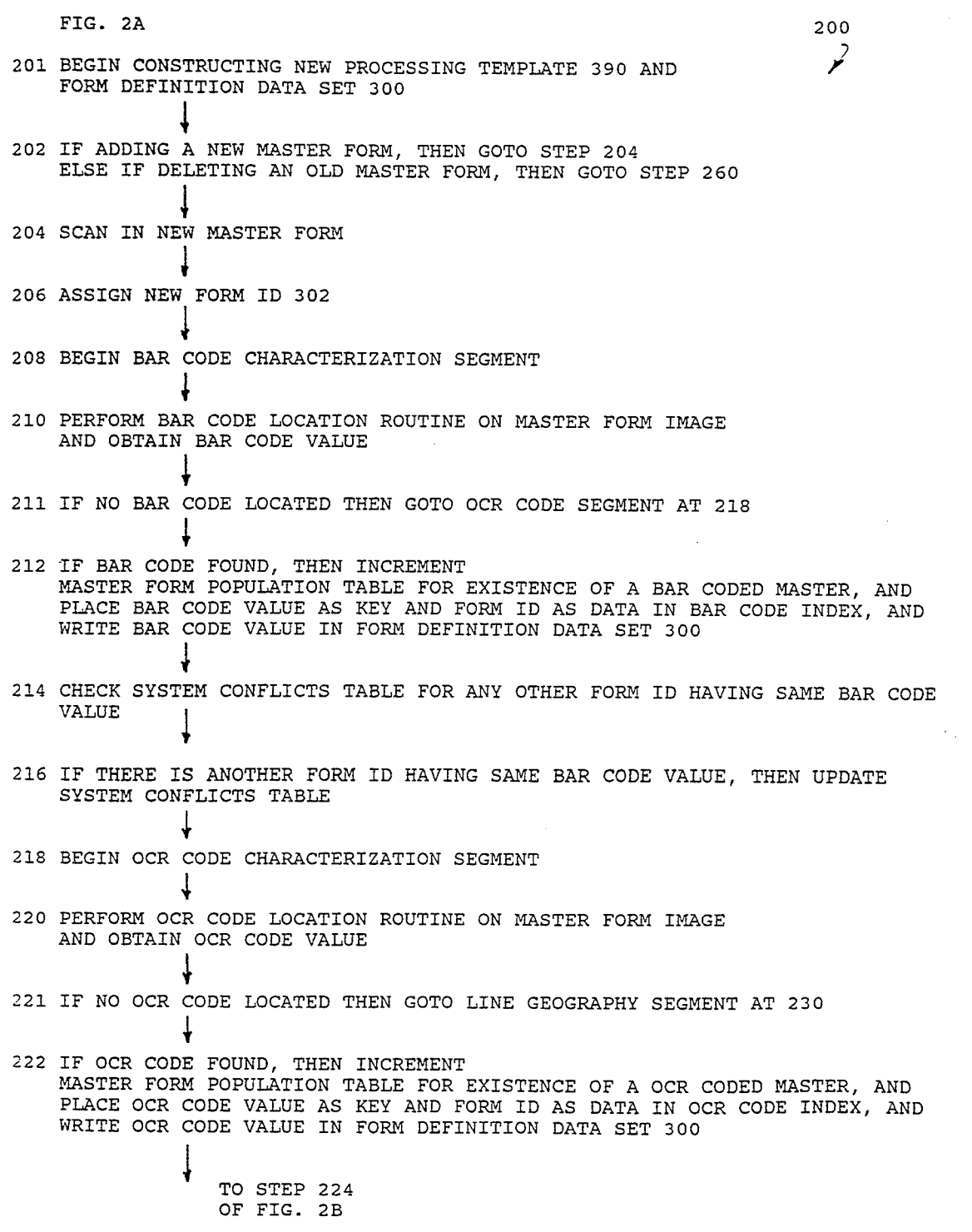

201 BEGIN CONSTRUCTING NEW PROCESSING TEMPLATE 390 AND FORM DEFINITION DATA SET 300

↓

202 IF ADDING A NEW MASTER FORM, THEN GOTO STEP 204
ELSE IF DELETING AN OLD MASTER FORM, THEN GOTO STEP 260

↓

204 SCAN IN NEW MASTER FORM

↓

206 ASSIGN NEW FORM ID 302

↓

208 BEGIN BAR CODE CHARACTERIZATION SEGMENT

↓

210 PERFORM BAR CODE LOCATION ROUTINE ON MASTER FORM IMAGE AND OBTAIN BAR CODE VALUE

↓

211 IF NO BAR CODE LOCATED THEN GOTO OCR CODE SEGMENT AT 218

↓

212 IF BAR CODE FOUND, THEN INCREMENT MASTER FORM POPULATION TABLE FOR EXISTENCE OF A BAR CODED MASTER, AND PLACE BAR CODE VALUE AS KEY AND FORM ID AS DATA IN BAR CODE INDEX, AND WRITE BAR CODE VALUE IN FORM DEFINITION DATA SET 300

↓

214 CHECK SYSTEM CONFLICTS TABLE FOR ANY OTHER FORM ID HAVING SAME BAR CODE VALUE

↓

216 IF THERE IS ANOTHER FORM ID HAVING SAME BAR CODE VALUE, THEN UPDATE SYSTEM CONFLICTS TABLE

↓

218 BEGIN OCR CODE CHARACTERIZATION SEGMENT

↓

220 PERFORM OCR CODE LOCATION ROUTINE ON MASTER FORM IMAGE AND OBTAIN OCR CODE VALUE

↓

221 IF NO OCR CODE LOCATED THEN GOTO LINE GEOGRAPHY SEGMENT AT 230

↓

222 IF OCR CODE FOUND, THEN INCREMENT MASTER FORM POPULATION TABLE FOR EXISTENCE OF A OCR CODED MASTER, AND PLACE OCR CODE VALUE AS KEY AND FORM ID AS DATA IN OCR CODE INDEX, AND WRITE OCR CODE VALUE IN FORM DEFINITION DATA SET 300

↓

TO STEP 224 OF FIG. 2B

FIG. 2B

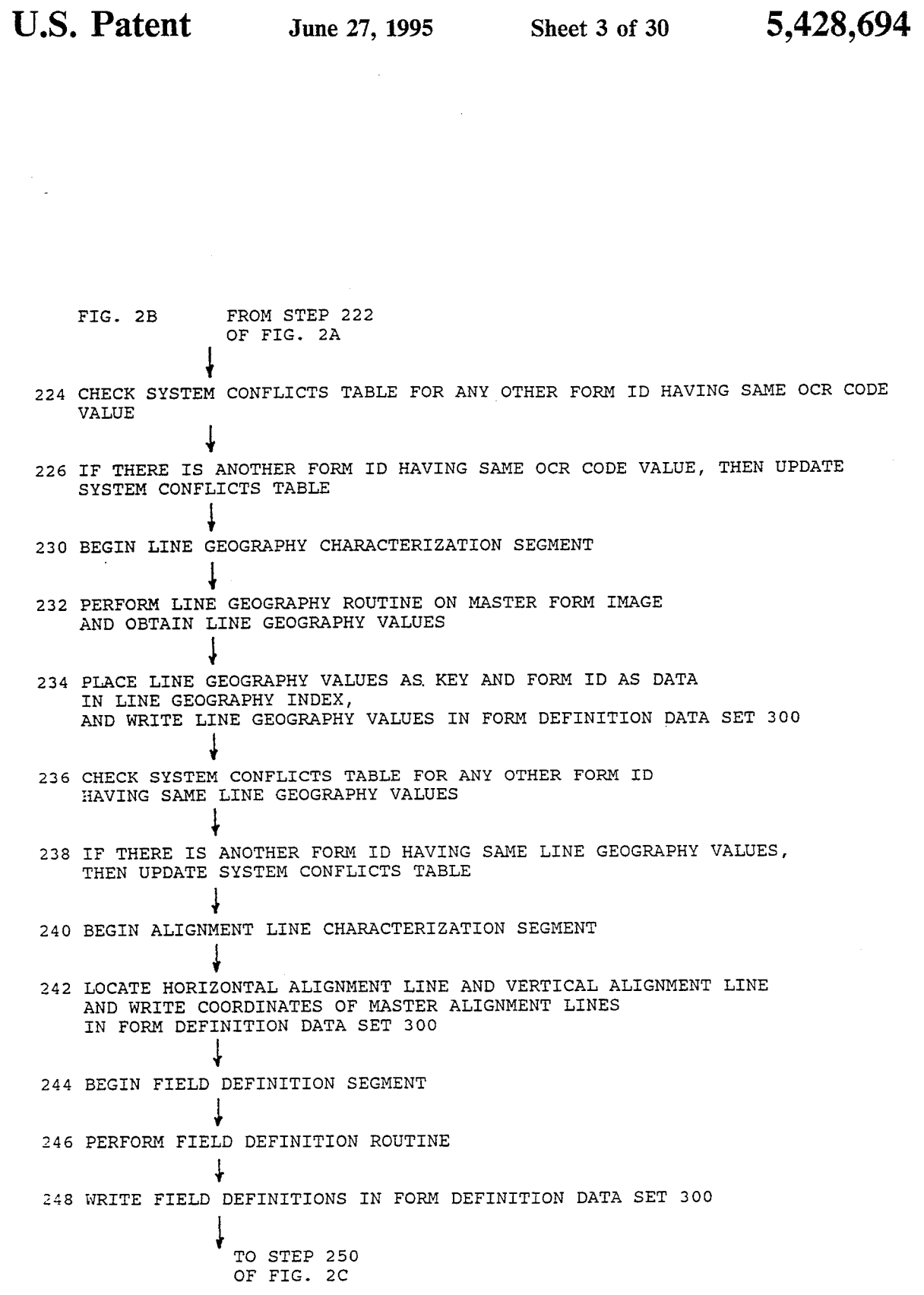

FROM STEP 222 OF FIG. 2A

224 CHECK SYSTEM CONFLICTS TABLE FOR ANY OTHER FORM ID HAVING SAME OCR CODE VALUE

↓

226 IF THERE IS ANOTHER FORM ID HAVING SAME OCR CODE VALUE, THEN UPDATE SYSTEM CONFLICTS TABLE

↓

230 BEGIN LINE GEOGRAPHY CHARACTERIZATION SEGMENT

↓

232 PERFORM LINE GEOGRAPHY ROUTINE ON MASTER FORM IMAGE AND OBTAIN LINE GEOGRAPHY VALUES

↓

234 PLACE LINE GEOGRAPHY VALUES AS KEY AND FORM ID AS DATA IN LINE GEOGRAPHY INDEX, AND WRITE LINE GEOGRAPHY VALUES IN FORM DEFINITION DATA SET 300

↓

236 CHECK SYSTEM CONFLICTS TABLE FOR ANY OTHER FORM ID HAVING SAME LINE GEOGRAPHY VALUES

↓

238 IF THERE IS ANOTHER FORM ID HAVING SAME LINE GEOGRAPHY VALUES, THEN UPDATE SYSTEM CONFLICTS TABLE

↓

240 BEGIN ALIGNMENT LINE CHARACTERIZATION SEGMENT

↓

242 LOCATE HORIZONTAL ALIGNMENT LINE AND VERTICAL ALIGNMENT LINE AND WRITE COORDINATES OF MASTER ALIGNMENT LINES IN FORM DEFINITION DATA SET 300

↓

244 BEGIN FIELD DEFINITION SEGMENT

↓

246 PERFORM FIELD DEFINITION ROUTINE

↓

248 WRITE FIELD DEFINITIONS IN FORM DEFINITION DATA SET 300

↓

TO STEP 250 OF FIG. 2C

FIG. 2C

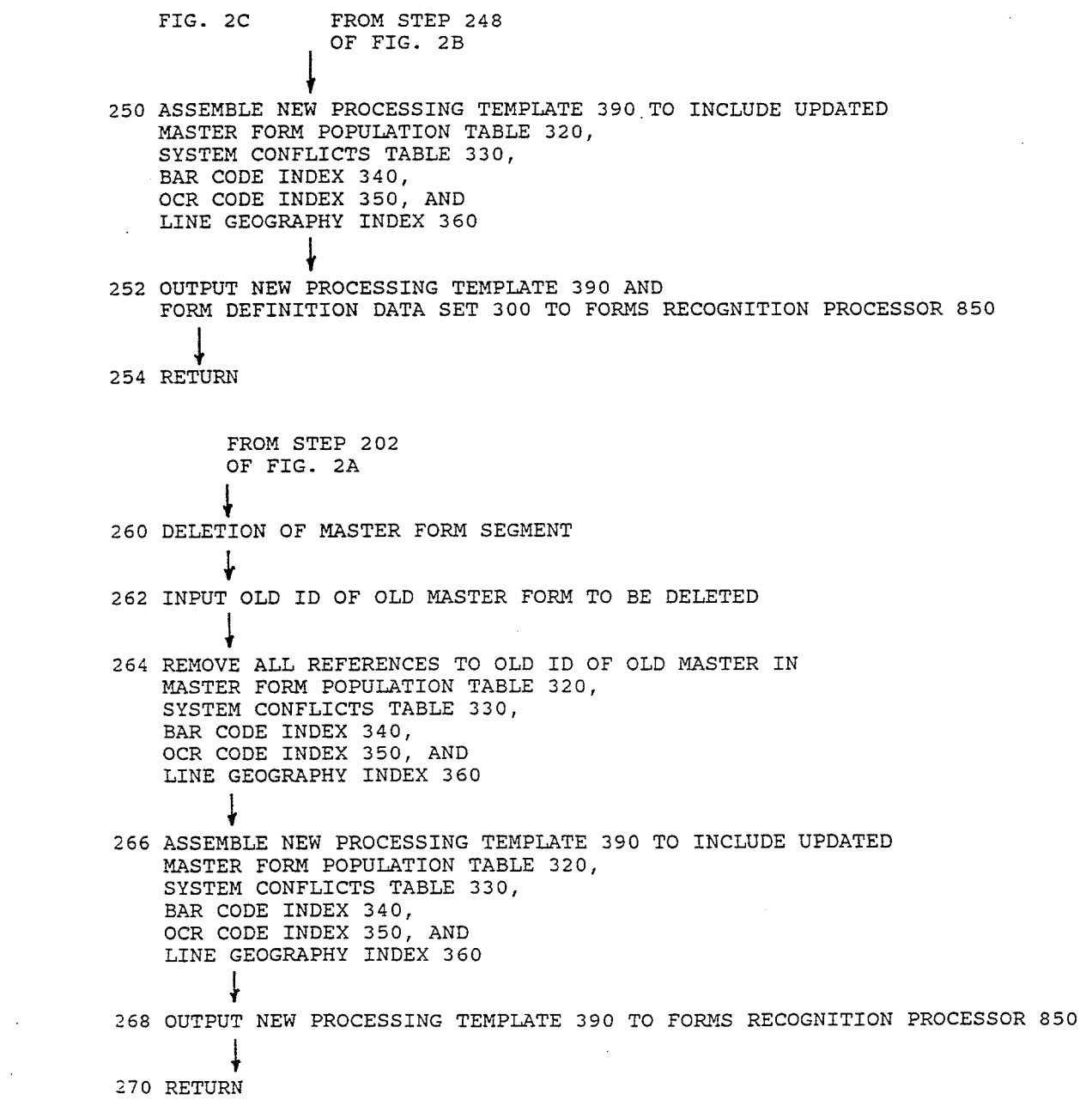

FROM STEP 248
OF FIG. 2B

250 ASSEMBLE NEW PROCESSING TEMPLATE 390 TO INCLUDE UPDATED
MASTER FORM POPULATION TABLE 320,
SYSTEM CONFLICTS TABLE 330,
BAR CODE INDEX 340,
OCR CODE INDEX 350, AND
LINE GEOGRAPHY INDEX 360

252 OUTPUT NEW PROCESSING TEMPLATE 390 AND
FORM DEFINITION DATA SET 300 TO FORMS RECOGNITION PROCESSOR 850

254 RETURN

FROM STEP 202
OF FIG. 2A

260 DELETION OF MASTER FORM SEGMENT

262 INPUT OLD ID OF OLD MASTER FORM TO BE DELETED

264 REMOVE ALL REFERENCES TO OLD ID OF OLD MASTER IN
MASTER FORM POPULATION TABLE 320,
SYSTEM CONFLICTS TABLE 330,
BAR CODE INDEX 340,
OCR CODE INDEX 350, AND
LINE GEOGRAPHY INDEX 360

266 ASSEMBLE NEW PROCESSING TEMPLATE 390 TO INCLUDE UPDATED
MASTER FORM POPULATION TABLE 320,
SYSTEM CONFLICTS TABLE 330,
BAR CODE INDEX 340,
OCR CODE INDEX 350, AND
LINE GEOGRAPHY INDEX 360

268 OUTPUT NEW PROCESSING TEMPLATE 390 TO FORMS RECOGNITION PROCESSOR 850

270 RETURN

Figures 3A, 3B, 3C:
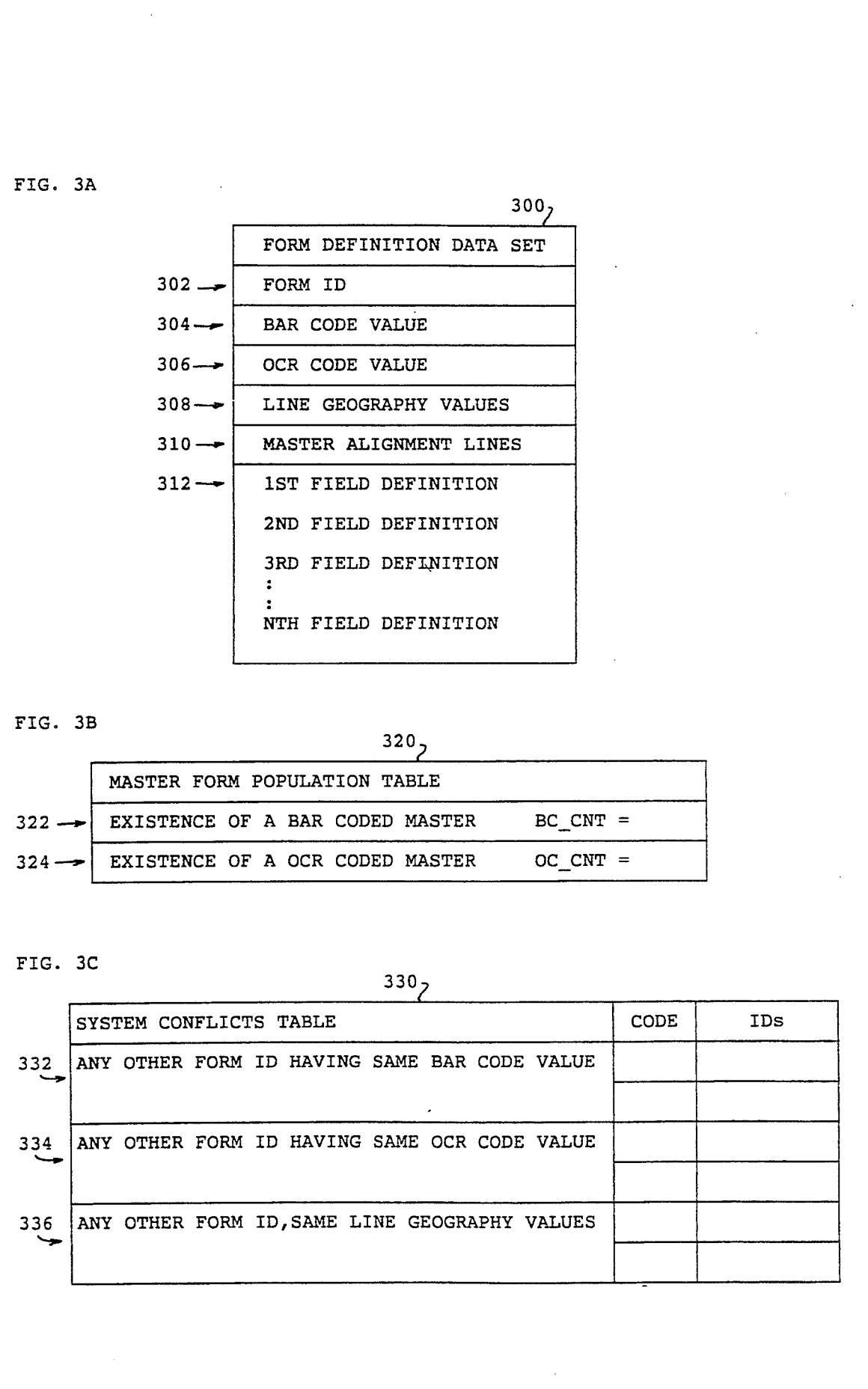

| FORM DEFINITION DATA SET |
|---|
| 302 → FORM ID |
| 304 → BAR CODE VALUE |
| 306 → OCR CODE VALUE |
| 308 → LINE GEOGRAPHY VALUES |
| 310 → MASTER ALIGNMENT LINES |
| 312 → 1ST FIELD DEFINITION<br>2ND FIELD DEFINITION<br>3RD FIELD DEFINITION<br>:<br>:<br>NTH FIELD DEFINITION |

| MASTER FORM POPULATION TABLE | |
|---|---|
| 322 → EXISTENCE OF A BAR CODED MASTER | BC_CNT = |
| 324 → EXISTENCE OF A OCR CODED MASTER | OC_CNT = |

| SYSTEM CONFLICTS TABLE | CODE | IDs |
|---|---|---|
| 332 → ANY OTHER FORM ID HAVING SAME BAR CODE VALUE | | |
| | | |
| 334 → ANY OTHER FORM ID HAVING SAME OCR CODE VALUE | | |
| | | |
| 336 → ANY OTHER FORM ID,SAME LINE GEOGRAPHY VALUES | | |
| | | |

Figures 3D, 3E:
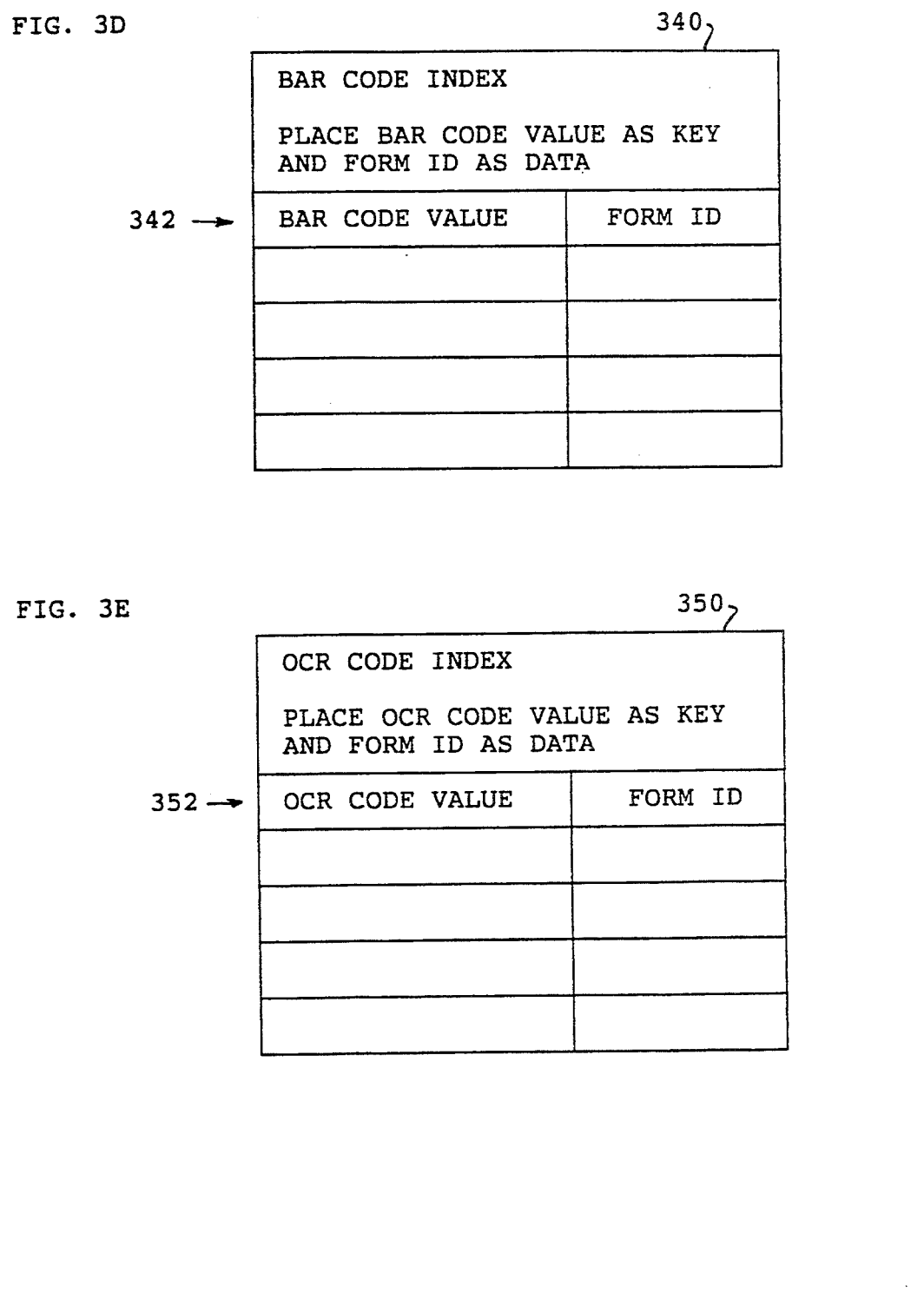

BAR CODE INDEX

PLACE BAR CODE VALUE AS KEY AND FORM ID AS DATA

342 →

| BAR CODE VALUE | FORM ID |
|---|---|
| | |
| | |
| | |
| | |

OCR CODE INDEX

PLACE OCR CODE VALUE AS KEY AND FORM ID AS DATA

352 →

| OCR CODE VALUE | FORM ID |
|---|---|
| | |
| | |
| | |
| | |

Figure 3G:
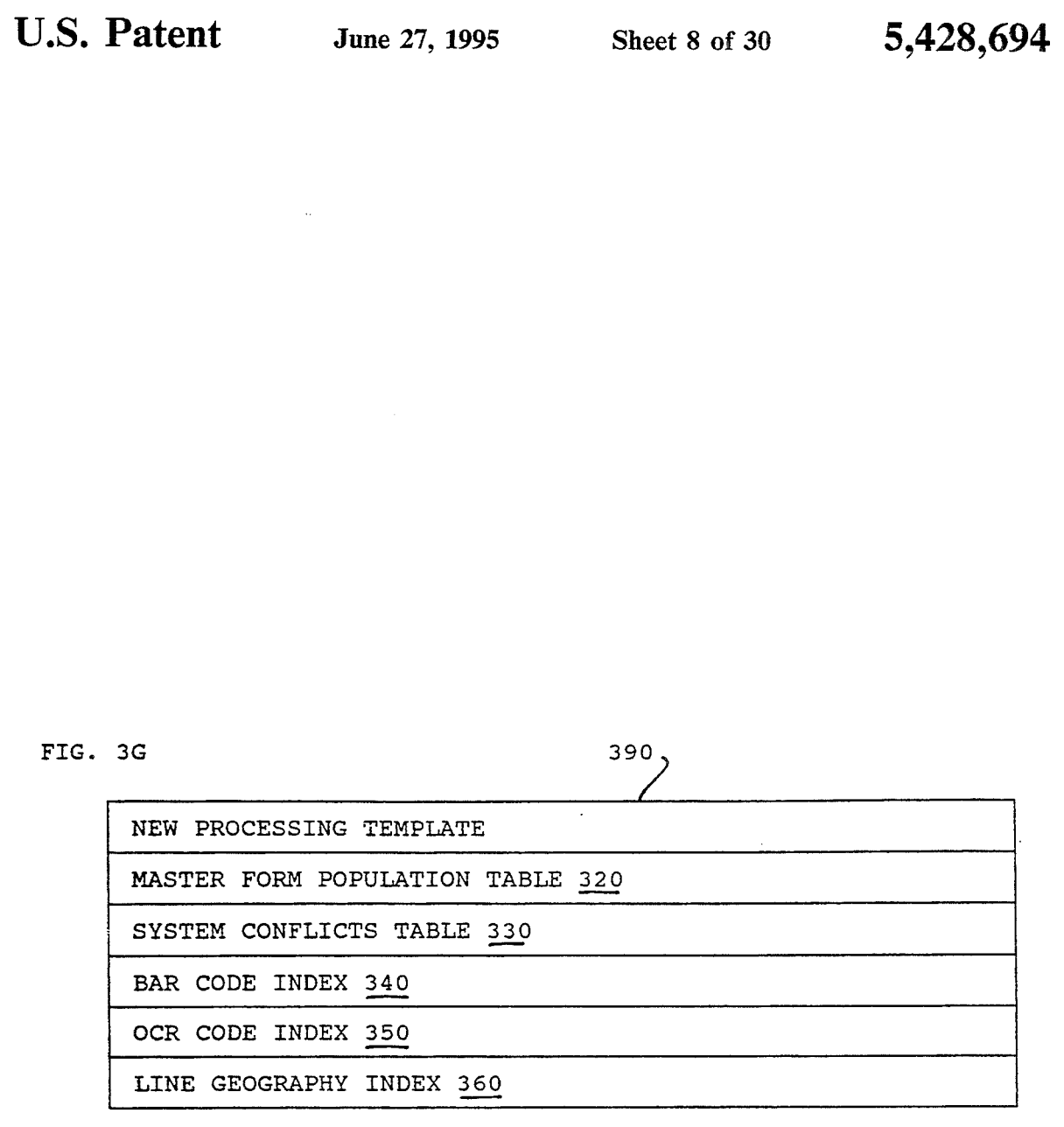

| NEW PROCESSING TEMPLATE |
| --- |
| MASTER FORM POPULATION TABLE 320 |
| SYSTEM CONFLICTS TABLE 330 |
| BAR CODE INDEX 340 |
| OCR CODE INDEX 350 |
| LINE GEOGRAPHY INDEX 360 |

| RECENTLY PROCESSED COMPLETED-FORM POPULATION TABLE |
|---|
| 372 EXISTENCE OF ANY BAR CODED COMPLETED FORMS RB_CNT = |
| 374 EXISTENCE OF ANY OCR CODED COMPLETED FORMS RO_CNT = |

| RECENTLY PROCESSED COMPLETED-FORM SKEW AND OFFSET TABLE |
|---|
| 382 NUMBER OF RECENTLY COMPLETED FORMS THAT HAVE SKEW OR OFFSET GREATER THAN THRESHOLD VALUE SK_CNT = |
| 384 THRESHOLD VALUE = |
| 386 SET SKEW/OFFSET STATE = |

Figure 4A:
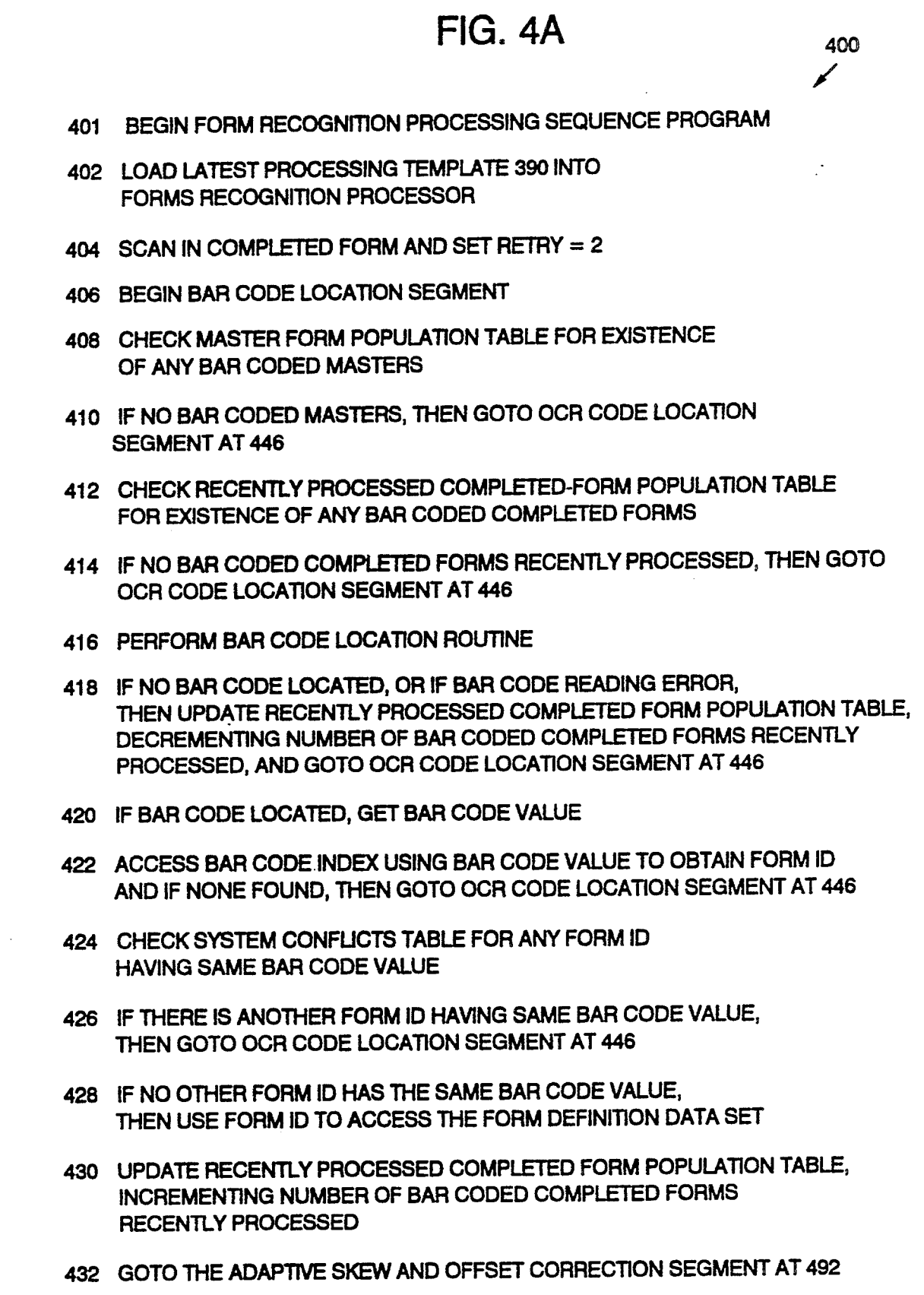

401 BEGIN FORM RECOGNITION PROCESSING SEQUENCE PROGRAM

402 LOAD LATEST PROCESSING TEMPLATE 390 INTO FORMS RECOGNITION PROCESSOR

404 SCAN IN COMPLETED FORM AND SET RETRY = 2

406 BEGIN BAR CODE LOCATION SEGMENT

408 CHECK MASTER FORM POPULATION TABLE FOR EXISTENCE OF ANY BAR CODED MASTERS

410 IF NO BAR CODED MASTERS, THEN GOTO OCR CODE LOCATION SEGMENT AT 446

412 CHECK RECENTLY PROCESSED COMPLETED-FORM POPULATION TABLE FOR EXISTENCE OF ANY BAR CODED COMPLETED FORMS

414 IF NO BAR CODED COMPLETED FORMS RECENTLY PROCESSED, THEN GOTO OCR CODE LOCATION SEGMENT AT 446

416 PERFORM BAR CODE LOCATION ROUTINE

418 IF NO BAR CODE LOCATED, OR IF BAR CODE READING ERROR, THEN UPDATE RECENTLY PROCESSED COMPLETED FORM POPULATION TABLE, DECREMENTING NUMBER OF BAR CODED COMPLETED FORMS RECENTLY PROCESSED, AND GOTO OCR CODE LOCATION SEGMENT AT 446

420 IF BAR CODE LOCATED, GET BAR CODE VALUE

422 ACCESS BAR CODE INDEX USING BAR CODE VALUE TO OBTAIN FORM ID AND IF NONE FOUND, THEN GOTO OCR CODE LOCATION SEGMENT AT 446

424 CHECK SYSTEM CONFLICTS TABLE FOR ANY FORM ID HAVING SAME BAR CODE VALUE

426 IF THERE IS ANOTHER FORM ID HAVING SAME BAR CODE VALUE, THEN GOTO OCR CODE LOCATION SEGMENT AT 446

428 IF NO OTHER FORM ID HAS THE SAME BAR CODE VALUE, THEN USE FORM ID TO ACCESS THE FORM DEFINITION DATA SET

430 UPDATE RECENTLY PROCESSED COMPLETED FORM POPULATION TABLE, INCREMENTING NUMBER OF BAR CODED COMPLETED FORMS RECENTLY PROCESSED

432 GOTO THE ADAPTIVE SKEW AND OFFSET CORRECTION SEGMENT AT 492

FIG. 4B

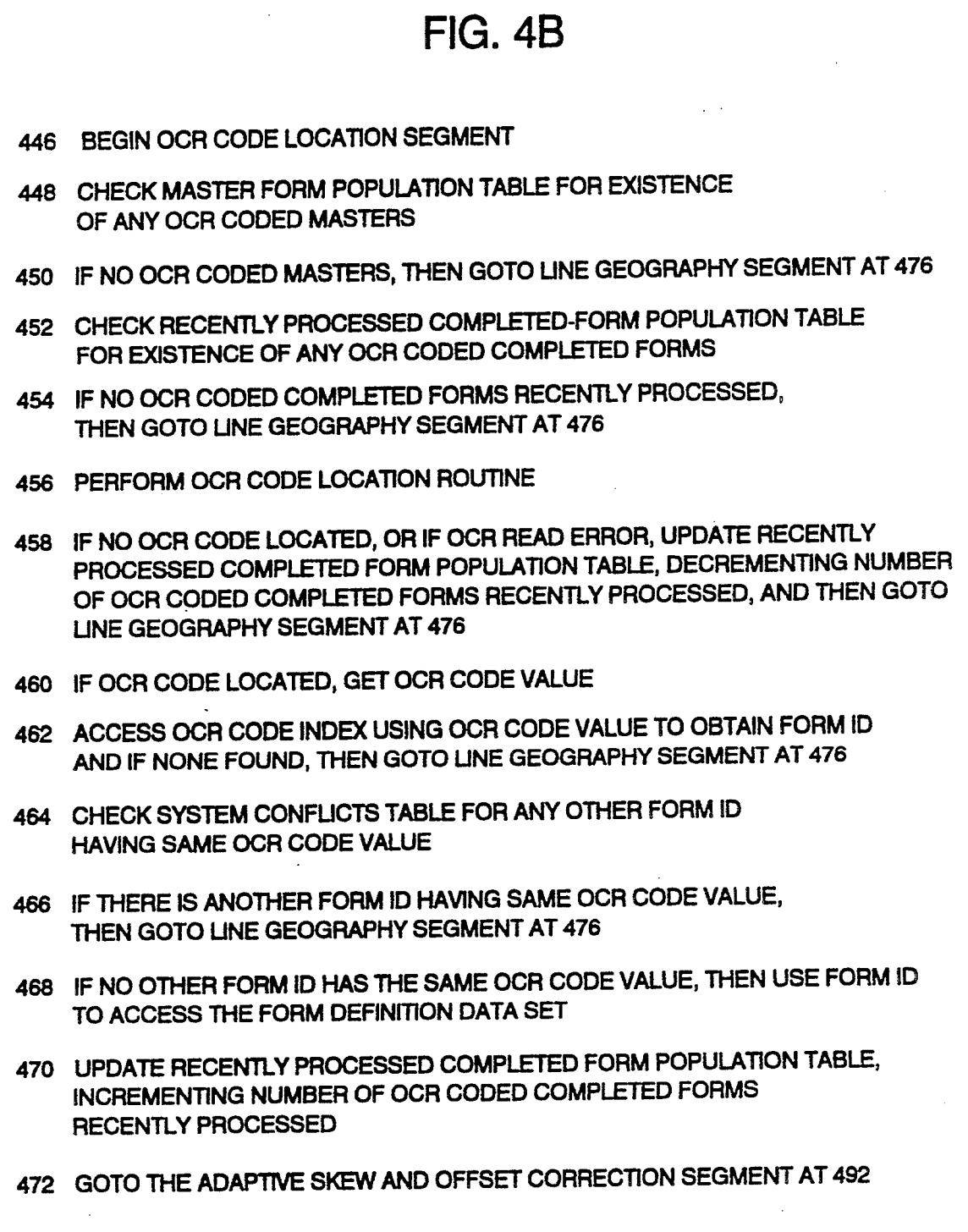

446 BEGIN OCR CODE LOCATION SEGMENT

448 CHECK MASTER FORM POPULATION TABLE FOR EXISTENCE OF ANY OCR CODED MASTERS

450 IF NO OCR CODED MASTERS, THEN GOTO LINE GEOGRAPHY SEGMENT AT 476

452 CHECK RECENTLY PROCESSED COMPLETED-FORM POPULATION TABLE FOR EXISTENCE OF ANY OCR CODED COMPLETED FORMS

454 IF NO OCR CODED COMPLETED FORMS RECENTLY PROCESSED, THEN GOTO LINE GEOGRAPHY SEGMENT AT 476

456 PERFORM OCR CODE LOCATION ROUTINE

458 IF NO OCR CODE LOCATED, OR IF OCR READ ERROR, UPDATE RECENTLY PROCESSED COMPLETED FORM POPULATION TABLE, DECREMENTING NUMBER OF OCR CODED COMPLETED FORMS RECENTLY PROCESSED, AND THEN GOTO LINE GEOGRAPHY SEGMENT AT 476

460 IF OCR CODE LOCATED, GET OCR CODE VALUE

462 ACCESS OCR CODE INDEX USING OCR CODE VALUE TO OBTAIN FORM ID AND IF NONE FOUND, THEN GOTO LINE GEOGRAPHY SEGMENT AT 476

464 CHECK SYSTEM CONFLICTS TABLE FOR ANY OTHER FORM ID HAVING SAME OCR CODE VALUE

466 IF THERE IS ANOTHER FORM ID HAVING SAME OCR CODE VALUE, THEN GOTO LINE GEOGRAPHY SEGMENT AT 476

468 IF NO OTHER FORM ID HAS THE SAME OCR CODE VALUE, THEN USE FORM ID TO ACCESS THE FORM DEFINITION DATA SET

470 UPDATE RECENTLY PROCESSED COMPLETED FORM POPULATION TABLE, INCREMENTING NUMBER OF OCR CODED COMPLETED FORMS RECENTLY PROCESSED

472 GOTO THE ADAPTIVE SKEW AND OFFSET CORRECTION SEGMENT AT 492

Figure 4C:
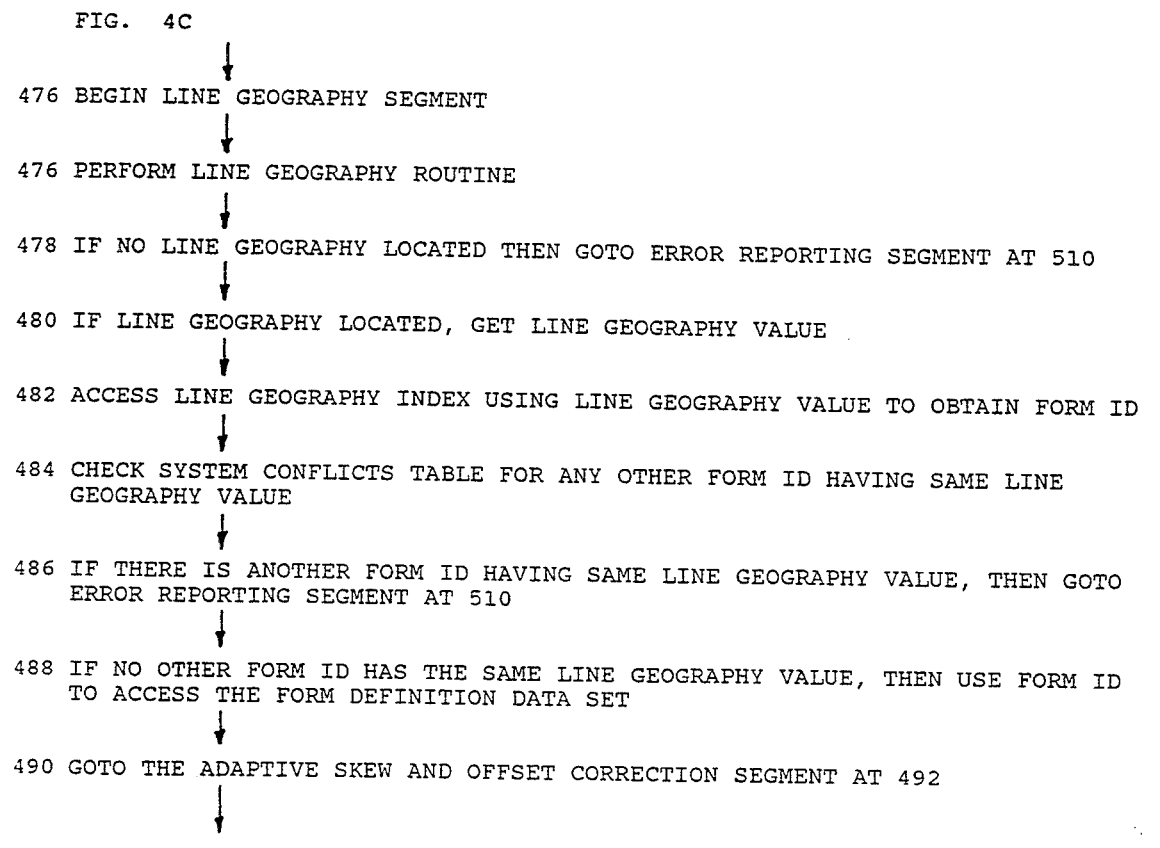

476 BEGIN LINE GEOGRAPHY SEGMENT

↓

476 PERFORM LINE GEOGRAPHY ROUTINE

↓

478 IF NO LINE GEOGRAPHY LOCATED THEN GOTO ERROR REPORTING SEGMENT AT 510

↓

480 IF LINE GEOGRAPHY LOCATED, GET LINE GEOGRAPHY VALUE

↓

482 ACCESS LINE GEOGRAPHY INDEX USING LINE GEOGRAPHY VALUE TO OBTAIN FORM ID

↓

484 CHECK SYSTEM CONFLICTS TABLE FOR ANY OTHER FORM ID HAVING SAME LINE GEOGRAPHY VALUE

↓

486 IF THERE IS ANOTHER FORM ID HAVING SAME LINE GEOGRAPHY VALUE, THEN GOTO ERROR REPORTING SEGMENT AT 510

↓

488 IF NO OTHER FORM ID HAS THE SAME LINE GEOGRAPHY VALUE, THEN USE FORM ID TO ACCESS THE FORM DEFINITION DATA SET

↓

490 GOTO THE ADAPTIVE SKEW AND OFFSET CORRECTION SEGMENT AT 492

Figure 4D:
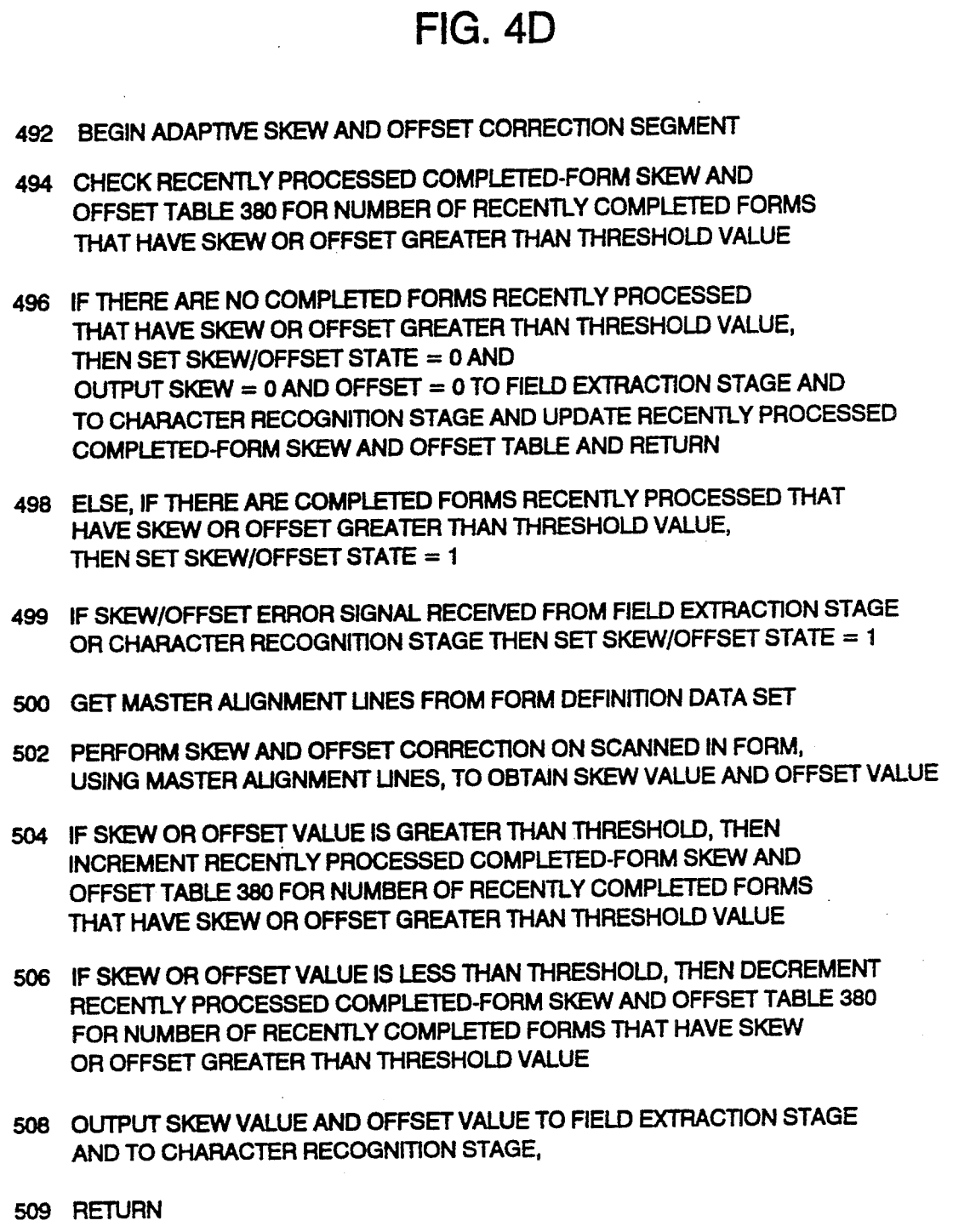

492 BEGIN ADAPTIVE SKEW AND OFFSET CORRECTION SEGMENT

494 CHECK RECENTLY PROCESSED COMPLETED-FORM SKEW AND OFFSET TABLE 380 FOR NUMBER OF RECENTLY COMPLETED FORMS THAT HAVE SKEW OR OFFSET GREATER THAN THRESHOLD VALUE

496 IF THERE ARE NO COMPLETED FORMS RECENTLY PROCESSED THAT HAVE SKEW OR OFFSET GREATER THAN THRESHOLD VALUE, THEN SET SKEW/OFFSET STATE = 0 AND OUTPUT SKEW = 0 AND OFFSET = 0 TO FIELD EXTRACTION STAGE AND TO CHARACTER RECOGNITION STAGE AND UPDATE RECENTLY PROCESSED COMPLETED-FORM SKEW AND OFFSET TABLE AND RETURN

498 ELSE, IF THERE ARE COMPLETED FORMS RECENTLY PROCESSED THAT HAVE SKEW OR OFFSET GREATER THAN THRESHOLD VALUE, THEN SET SKEW/OFFSET STATE = 1

499 IF SKEW/OFFSET ERROR SIGNAL RECEIVED FROM FIELD EXTRACTION STAGE OR CHARACTER RECOGNITION STAGE THEN SET SKEW/OFFSET STATE = 1

500 GET MASTER ALIGNMENT LINES FROM FORM DEFINITION DATA SET

502 PERFORM SKEW AND OFFSET CORRECTION ON SCANNED IN FORM, USING MASTER ALIGNMENT LINES, TO OBTAIN SKEW VALUE AND OFFSET VALUE

504 IF SKEW OR OFFSET VALUE IS GREATER THAN THRESHOLD, THEN INCREMENT RECENTLY PROCESSED COMPLETED-FORM SKEW AND OFFSET TABLE 380 FOR NUMBER OF RECENTLY COMPLETED FORMS THAT HAVE SKEW OR OFFSET GREATER THAN THRESHOLD VALUE

506 IF SKEW OR OFFSET VALUE IS LESS THAN THRESHOLD, THEN DECREMENT RECENTLY PROCESSED COMPLETED-FORM SKEW AND OFFSET TABLE 380 FOR NUMBER OF RECENTLY COMPLETED FORMS THAT HAVE SKEW OR OFFSET GREATER THAN THRESHOLD VALUE

508 OUTPUT SKEW VALUE AND OFFSET VALUE TO FIELD EXTRACTION STAGE AND TO CHARACTER RECOGNITION STAGE,

509 RETURN

Figure 4E:
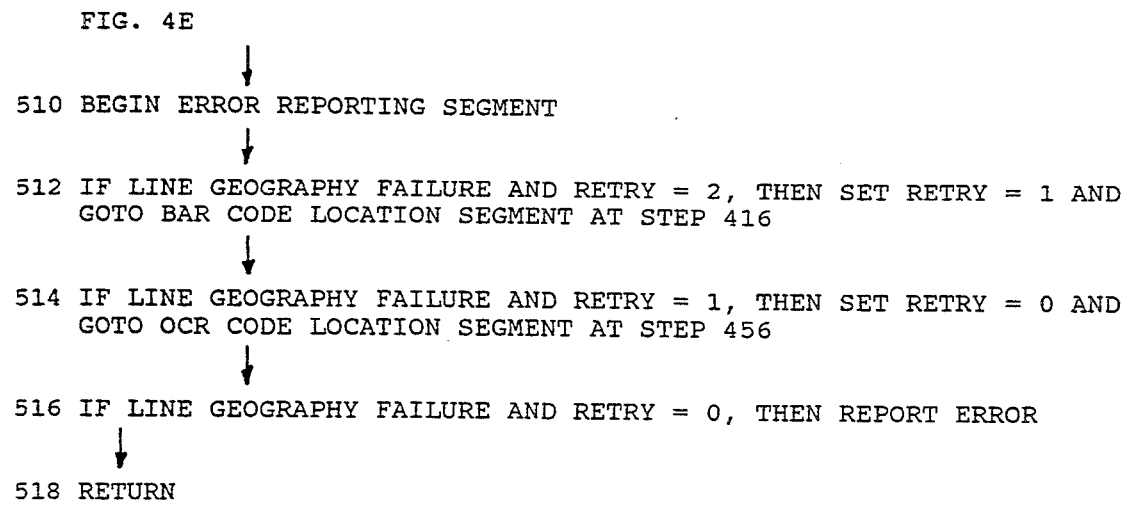

510 BEGIN ERROR REPORTING SEGMENT

↓

512 IF LINE GEOGRAPHY FAILURE AND RETRY = 2, THEN SET RETRY = 1 AND GOTO BAR CODE LOCATION SEGMENT AT STEP 416

↓

514 IF LINE GEOGRAPHY FAILURE AND RETRY = 1, THEN SET RETRY = 0 AND GOTO OCR CODE LOCATION SEGMENT AT STEP 456

↓

516 IF LINE GEOGRAPHY FAILURE AND RETRY = 0, THEN REPORT ERROR

↓

518 RETURN

FIG. 5
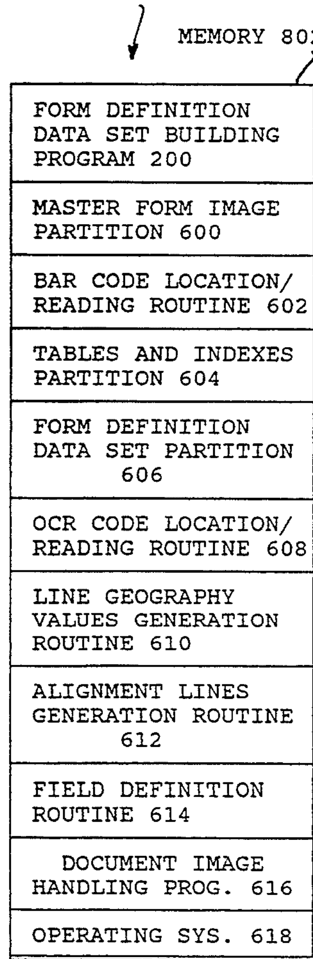
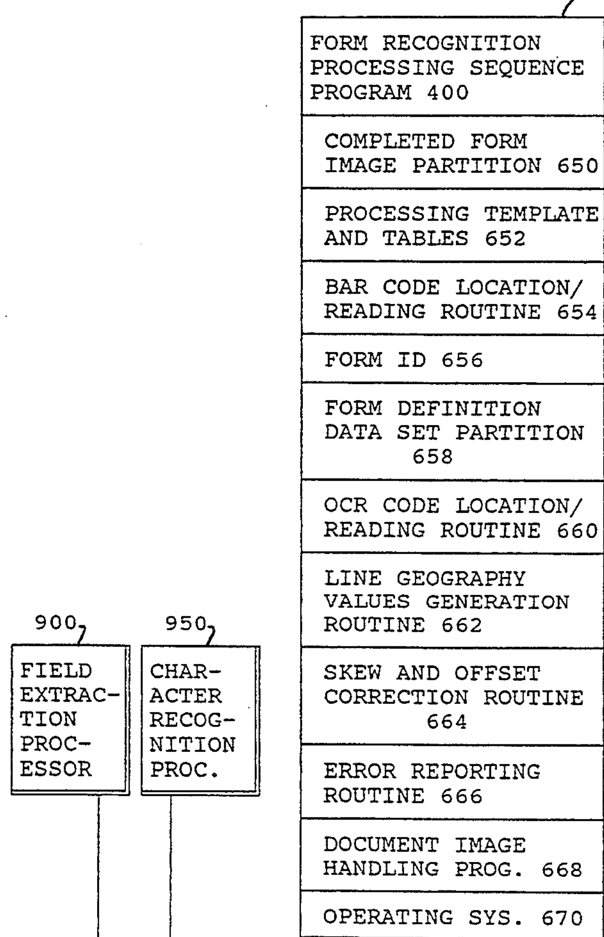
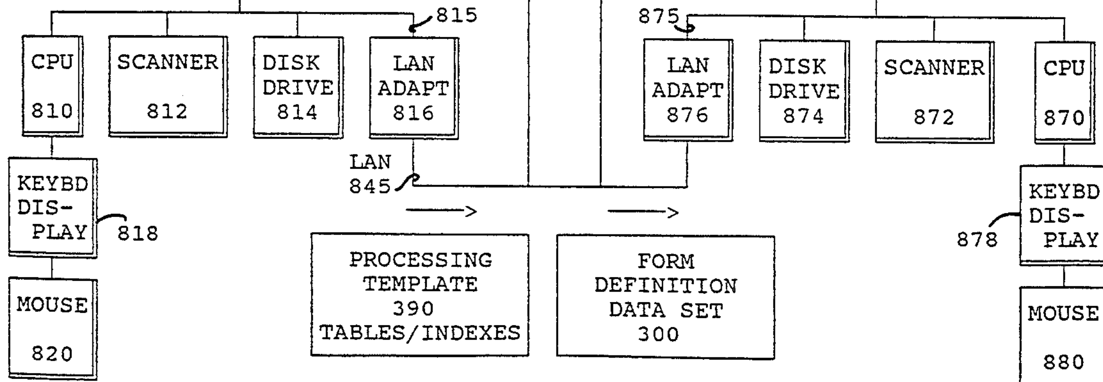

| FORM DEFINITION DATA SET |
|---|
| 302 — FORM ID = A |
| 304 — BAR CODE VALUE - |
| 306 — OCR CODE VALUE = 123-700 |
| 308 — LINE GEOGRAPHY VALUES<br>H = 8, V = 4 |
| 310 — MASTER ALIGNMENT LINES<br>H(5,10),(50,10)<br>V(5,10),(5,100) |
| 312 — 1ST FIELD DEFINITION<br>2ND FIELD DEFINITION<br>3RD FIELD DEFINITION<br>:<br>:<br>7TH FIELD DEFINITION |

| FORM DEFINITION DATA SET |
|---|
| 302 — FORM ID = B |
| 304 — BAR CODE VALUE - |
| 306 — OCR CODE VALUE = 123-456 |
| 308 — LINE GEOGRAPHY VALUES<br>H = 8, V = 4 |
| 310 — MASTER ALIGNMENT LINES<br>H(5,10),(50,10)<br>V(5,10),(5,100) |
| 312 — 1ST FIELD DEFINITION<br>2ND FIELD DEFINITION<br>3RD FIELD DEFINITION<br>:<br>:<br>7TH FIELD DEFINITION |

| MASTER FORM POPULATION TABLE | |
|---|---|
| 322 — EXISTENCE OF A BAR CODED MASTER | BC_CNT = - |
| 324 — EXISTENCE OF A OCR CODED MASTER | OC_CNT = 2 |

| SYSTEM CONFLICTS TABLE | CODE | IDs |
|---|---|---|
| 332 ANY OTHER FORM ID HAVING SAME BAR CODE VALUE | | |
| | | |
| 334 ANY OTHER FORM ID HAVING SAME OCR CODE VALUE | | |
| | | |
| 336 ANY OTHER FORM ID,SAME LINE GEOGRAPHY VALUES | H8,V4 | A,B |
| | | |

| BAR CODE INDEX<br><br>PLACE BAR CODE VALUE AS KEY AND FORM ID AS DATA | |
|---|---|
| BAR CODE VALUE | FORM ID |
| | |
| | |
| | |
| | |

| OCR CODE INDEX<br><br>PLACE OCR CODE VALUE AS KEY AND FORM ID AS DATA | |
|---|---|
| OCR CODE VALUE | FORM ID |
| 123-700 | A |
| 123-456 | B |
| | |
| | |

| | FORM DEFINITION DATA SET |
|---|---|
| 302 | FORM ID = C |
| 304 | BAR CODE VALUE = 102C |
| 306 | OCR CODE VALUE = |
| 308 | LINE GEOGRAPHY VALUES<br>H = 8, V = 4 |
| 310 | MASTER ALIGNMENT LINES<br>H(5,10),(50,10)<br>V(5,10),(5,100) |
| 312 | 1ST FIELD DEFINITION<br>2ND FIELD DEFINITION<br>3RD FIELD DEFINITION<br>:<br>:<br>7TH FIELD DEFINITION |

| | FORM DEFINITION DATA SET |
|---|---|
| 302 | FORM ID = D |
| 304 | BAR CODE VALUE = 102D |
| 306 | OCR CODE VALUE = |
| 308 | LINE GEOGRAPHY VALUES<br>H = 8, V = 5 |
| 310 | MASTER ALIGNMENT LINES<br>H(5,10),(50,10)<br>V(5,10),(5,100) |
| 312 | 1ST FIELD DEFINITION<br>2ND FIELD DEFINITION<br>3RD FIELD DEFINITION<br>:<br>:<br>8TH FIELD DEFINITION |

| | MASTER FORM POPULATION TABLE | |
|---|---|---|
| 322 | EXISTENCE OF A BAR CODED MASTER | BC_CNT = 2 |
| 324 | EXISTENCE OF A OCR CODED MASTER | OC_CNT = 2 |

| | SYSTEM CONFLICTS TABLE | CODE | IDs |
|---|---|---|---|
| 332 | ANY OTHER FORM ID HAVING SAME BAR CODE VALUE | | |
| | | | |
| 334 | ANY OTHER FORM ID HAVING SAME OCR CODE VALUE | | |
| | | | |
| 336 | ANY OTHER FORM ID,SAME LINE GEOGRAPHY VALUES | H8,V4 | A,B,C |
| | | | |

| BAR CODE INDEX<br><br>PLACE BAR CODE VALUE AS KEY AND FORM ID AS DATA | |
|---|---|
| BAR CODE VALUE | FORM ID |
| 102C | C |
| 102D | D |
| | |
| | |

| OCR CODE INDEX<br><br>PLACE OCR CODE VALUE AS KEY AND FORM ID AS DATA | |
|---|---|
| OCR CODE VALUE | FORM ID |
| 123-700 | A |
| 123-456 | B |
| | |
| | |

| | FORM DEFINITION DATA SET |
|---|---|
| 302 | FORM ID = E |
| 304 | BAR CODE VALUE = 102D |
| 306 | OCR CODE VALUE = |
| 308 | LINE GEOGRAPHY VALUES<br>H = 8, V = 6 |
| 310 | MASTER ALIGNMENT LINES<br>H(5,10),(50,10)<br>V(5,10),(5,100) |
| 312 | 1ST FIELD DEFINITION<br>2ND FIELD DEFINITION<br>3RD FIELD DEFINITION<br>:<br>:<br>9TH FIELD DEFINITION |

| | FORM DEFINITION DATA SET |
|---|---|
| 302 | FORM ID = F |
| 304 | BAR CODE VALUE = 102F |
| 306 | OCR CODE VALUE = |
| 308 | LINE GEOGRAPHY VALUES<br>H = 8, V = 7 |
| 310 | MASTER ALIGNMENT LINES<br>H(5,10),(50,10)<br>V(5,10),(5,100) |
| 312 | 1ST FIELD DEFINITION<br>2ND FIELD DEFINITION<br>3RD FIELD DEFINITION<br>:<br>:<br>10TH FIELD DEFINITION |

| | MASTER FORM POPULATION TABLE | |
|---|---|---|
| 322 | EXISTENCE OF A BAR CODED MASTER | BC_CNT = 4 |
| 324 | EXISTENCE OF A OCR CODED MASTER | OC_CNT = 2 |

| | SYSTEM CONFLICTS TABLE | CODE | IDs |
|---|---|---|---|
| 332 | ANY OTHER FORM ID HAVING SAME BAR CODE VALUE | 102D | D,E |
| | | | |
| 334 | ANY OTHER FORM ID HAVING SAME OCR CODE VALUE | | |
| | | | |
| 336 | ANY OTHER FORM ID,SAME LINE GEOGRAPHY VALUES | H8,V4 | A,B,C |
| | | | |

| BAR CODE INDEX<br><br>PLACE BAR CODE VALUE AS KEY AND FORM ID AS DATA | |
|---|---|
| BAR CODE VALUE | FORM ID |
| 102C | C |
| 102D | D |
| 102D | E |
| 102F | F |

| OCR CODE INDEX<br><br>PLACE OCR CODE VALUE AS KEY AND FORM ID AS DATA | |
|---|---|
| OCR CODE VALUE | FORM ID |
| 123-700 | A |
| 123-456 | B |
| | |
| | |

Figures 9A, 9B, 9C:
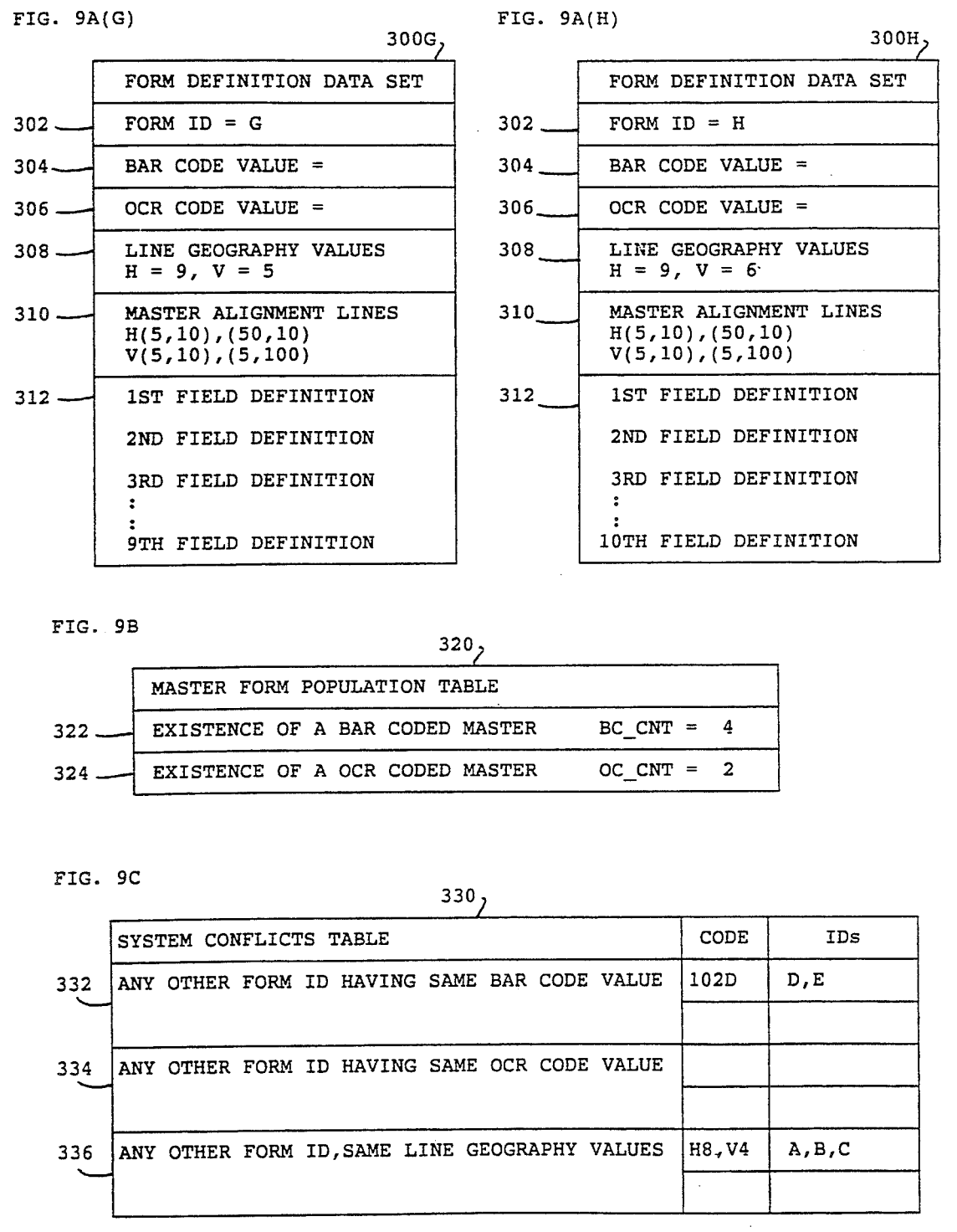

| FORM DEFINITION DATA SET |
|---|
| 302 FORM ID = G |
| 304 BAR CODE VALUE = |
| 306 OCR CODE VALUE = |
| 308 LINE GEOGRAPHY VALUES<br>H = 9, V = 5 |
| 310 MASTER ALIGNMENT LINES<br>H(5,10),(50,10)<br>V(5,10),(5,100) |
| 312 1ST FIELD DEFINITION<br>2ND FIELD DEFINITION<br>3RD FIELD DEFINITION<br>:<br>:<br>9TH FIELD DEFINITION |

| FORM DEFINITION DATA SET |
|---|
| 302 FORM ID = H |
| 304 BAR CODE VALUE = |
| 306 OCR CODE VALUE = |
| 308 LINE GEOGRAPHY VALUES<br>H = 9, V = 6 |
| 310 MASTER ALIGNMENT LINES<br>H(5,10),(50,10)<br>V(5,10),(5,100) |
| 312 1ST FIELD DEFINITION<br>2ND FIELD DEFINITION<br>3RD FIELD DEFINITION<br>:<br>:<br>10TH FIELD DEFINITION |

| MASTER FORM POPULATION TABLE | |
|---|---|
| 322 EXISTENCE OF A BAR CODED MASTER | BC_CNT = 4 |
| 324 EXISTENCE OF A OCR CODED MASTER | OC_CNT = 2 |

| SYSTEM CONFLICTS TABLE | CODE | IDs |
|---|---|---|
| 332 ANY OTHER FORM ID HAVING SAME BAR CODE VALUE | 102D | D,E |
| | | |
| 334 ANY OTHER FORM ID HAVING SAME OCR CODE VALUE | | |
| | | |
| 336 ANY OTHER FORM ID,SAME LINE GEOGRAPHY VALUES | H8,V4 | A,B,C |
| | | |

| BAR CODE INDEX<br><br>PLACE BAR CODE VALUE AS KEY AND FORM ID AS DATA | |
|---|---|
| BAR CODE VALUE | FORM ID |
| 102C | C |
| 102D | D |
| 102D | E |
| 102F | F |

| OCR CODE INDEX<br><br>PLACE OCR CODE VALUE AS KEY AND FORM ID AS DATA | |
|---|---|
| OCR CODE VALUE | FORM ID |
| 123-700 | A |
| 123-456 | B |
| | |
| | |

| RECENTLY PROCESSED COMPLETED-FORM POPULATION TABLE | |
|---|---|
| 372 EXISTENCE OF ANY BAR CODED COMPLETED FORMS | RB_CNT = 30 |
| 374 EXISTENCE OF ANY OCR CODED COMPLETED FORMS | RO_CNT = 20 |

| RECENTLY PROCESSED COMPLETED-FORM SKEW AND OFFSET TABLE | | |
|---|---|---|
| 382 NUMBER OF RECENTLY COMPLETED FORMS THAT HAVE SKEW OR OFFSET GREATER THAN THRESHOLD VALUE | SK_CNT = | 10 |
| 384 THRESHOLD VALUE = | | 1 |
| 386 SET SKEW/OFFSET STATE = | | 1 |

| RECENTLY PROCESSED COMPLETED-FORM POPULATION TABLE | |
|---|---|
| 372 EXISTENCE OF ANY BAR CODED COMPLETED FORMS | RB_CNT = 0 |
| 374 EXISTENCE OF ANY OCR CODED COMPLETED FORMS | RO_CNT = 0 |

| RECENTLY PROCESSED COMPLETED-FORM SKEW AND OFFSET TABLE | | |
|---|---|---|
| 382 NUMBER OF RECENTLY COMPLETED FORMS THAT HAVE SKEW OR OFFSET GREATER THAN THRESHOLD VALUE | SK_CNT = | 10 |
| 384 THRESHOLD VALUE = | | 1 |
| 386 SET SKEW/OFFSET STATE = | | 1 |

| RECENTLY PROCESSED COMPLETED-FORM POPULATION TABLE | |
|---|---|
| 372 EXISTENCE OF ANY BAR CODED COMPLETED FORMS | RB_CNT = 30 |
| 374 EXISTENCE OF ANY OCR CODED COMPLETED FORMS | RO_CNT = 20 |

| RECENTLY PROCESSED COMPLETED-FORM SKEW AND OFFSET TABLE | | |
|---|---|---|
| 382 NUMBER OF RECENTLY COMPLETED FORMS THAT HAVE SKEW OR OFFSET GREATER THAN THRESHOLD VALUE | SK_CNT = | 0 |
| 384 THRESHOLD VALUE = | | 1 |
| 386 SET SKEW/OFFSET STATE = | | 0 |

DATA PROCESSING SYSTEM AND METHOD FOR FORMS DEFINITION, RECOGNITION AND VERIFICATION OF SCANNED IMAGES OF DOCUMENT FORMS

BACKGROUND OF THE INVENTION

1. Technical Field

The invention disclosed broadly relates to data processing systems and methods and more particularly relates to techniques for the forms recognition of scanned document images.

2. Related Patent Applications

This patent application is related to the U.S. Pat. No. 5,251,273, issued Oct. 5, 1992, entitled "Data Processing System and Method for Sequentially Repairing Character Recognition Errors for Scanned Images of Document Forms," by T. S. Betts, V. M. Carras, L. B. Knecht, T. L. Paulson, and G. R. Anderson, the application being assigned to the IBM Corporation and incorporated herein by reference.

This patent application is also related to the U.S. Pat. No. 5,305,396, issued Apr. 19, 1994, and entitled "Data Processing System and Method for Selecting Customized Character Recognition Processes and Coded Data Repair Processes for Scanned Images of Document Forms," by T. S. Betts, V. M. Carras and L. B. Knecht, the patent being assigned to the IBM Corporation and incorporated herein by reference.

This patent application is also related to U.S. Pat. No. 5,140,650 entitled "A Computer Implemented Method for Automatic Extraction of Data From Printed Forms." by R. G. Casey and D. R. Ferguson, assigned to the IBM Corporation and incorporated herein by reference.

This patent application is also related to U.S. Pat. No. 4,992,650 entitled "Method and Apparatus for Bar Code Recognition in a Digital Image," by P. J. Somerville, assigned to the IBM Corporation and incorporated herein by reference.

3. Background Art

The above referenced copending patent applications by T. S. Belts, et al. describe the system context within which the invention disclosed herein finds application. The system disclosed by T. S. Belts, et al. defines document forms and then reads filled-in copies of those document forms which are scanned in to a digital imaging system. Each document form which is defined, includes several fields within which handwritten or typed information is to be entered. The T. S. Bens, et al. system examines the digital image of a scanned-in form to identify the form, and then locate the respective fields from which images are extracted for character recognition operations. ?

The processing of document form images includes the stages of defining a master form image, recognizing completed form images of the master, separating field images from the completed form, and recognizing the text characters in the field images. Such processing is described in the above referenced T. S. Belts, et al. patent applications. Each master form has a unique identity name or number (ID) assigned to it, to distinguish it from other master forms. Each master form has an array of fields generally delineated by preprinted horizontal and vertical lines, within which data can be marked, thereby making a completed form. The shape of the horizontal and vertical lines is the line geography of the form.

The definition of a master form image is stored in a form definition data set which includes the name of the form, the value of any preprinted bar code or OCR code, a characterization of the preprinted line geography, the location of the fields and usually characterizations of the type of text that is expected for each of the fields. The objective of the forms recognition process is to take a completed form of an unknown identity and infer its identity from clues contained in the image. Once the identity is ascertained, the correct form definition data set can be selected to enable location and processing of the data written into the fields of the completed form.

Line geography can be used at the time of forms recognition to identify the master form corresponding to the completed form being processed. A simple example would be using the number of horizontal and vertical lines on the master form to recognize corresponding, completed forms. Generally, however, much more complex characterizations of line geography must be employed in matching operations to recognize and distinguish forms whose preprinted shapes are similar.

Usually a master form will also have an identifying mark such as a preprinted bar code or a preprinted optical character recognition (OCR) code that can be used at the time of forms recognition to identify the master form corresponding to the completed form being processed. An example process of bar code location and reading is described in the above referenced P. J. Somerville patent. Although the process of locating a bar code location and reading it or the process of locating an OCR code location and reading it require an interval of time to complete, they generally are faster than the process of using line geography and matching operations to perform forms recognition of a particular completed form being processed.

Another requirement of the forms recognition process is the assessment of the quality of the scanned image received by the scanning device. If the scanned image of the completed document is misregistered, that information must be passed on to the field separation stage and/or the character recognition stage, to enable a faster and more accurate location of the fields and text on the completed form. If the image of the completed form is rotated slightly from the axis of travel of the document in the scanner, the error is called skew. If the image is displaced vertically in the direction of the path of travel of the document in the scanner, this is called offset. Scanners vary in quality and the degree of skew and offset of the completed images will vary with the particular scanner in use and also with the technique of the operator feeding documents into the scanner. Skew and offset are usually measured during the forms recognition process, after the identity of the completed form has been ascertained. The line geometry of the master form, as represented in the form definition data set, is compared with the line geometry of the image of the completed form, resulting in skew and offset correction values that are passed on to the later stages of the process. This process of measuring the skew and offset of completed form images occupies an interval of time.

In business applications using many types of master form documents, many form definition data sets will be stored in the system. In many business applications, completed forms corresponding to many different types of master forms are received and processed on the same day. The volume of completed forms and the diversity of their master form types, makes it important to minimize the time required to perform the forms recognition process.

OBJECTS OF THE INVENTION

It is therefore an object of the invention to minimize the time required to perform the forms recognition process.

It is another object of the invention to minimize the time required to perform the forms recognition process, by adaptively changing the processing sequence in response to the types of master form documents which have been defined.

It is another object of the invention to minimize the time required to perform the forms recognition process, by adaptively changing the processing sequence in response to the types of completed form images that have been recently processed.

It is another object of the invention to minimize the time required to perform the forms recognition process, by adaptively changing the processing sequence in response to the amount of skew and offset measured for completed form images that have been recently processed.

SUMMARY OF THE INVENTION

These and other objects, features and advantages are accomplished by the invention. An improved forms recognition method and system are disclosed, that minimizes the time required to perform the forms recognition process, by adaptively changing the processing sequence. In accordance with the invention, when new master forms are defined in the system, a new processing template is also defined. The processing template includes tables and indexes the give the profile of all the master forms that have been defined in the system. The processing template is then referred to at the time of forms recognition processing, to adaptively choose which forms recognition operations to perform, to minimize the time required to finish processing a particular completed form.

For example, the default sequence of forms recognition operations may be to try bar code recognition first, followed by trying OCR code recognition, followed by trying line geography recognition, followed by performing a skew and offset correction operation. In accordance with the invention, reference is made to the processing template, to determine if there have been no bar coded master forms defined in the system, and if that is the case, the bar code operations are adaptively skipped.

Further in accordance with the invention, reference is made to tables compiled previous forms processing sessions, to determine if there have been no bar coded completed forms processed recently in the system, and if that is the case, the bar code operations are adaptively skipped.

Further in accordance with the invention, reference is made to the processing template, to determine if there have been no OCR coded master forms defined in the system, and if that is the case, the OCR code operations are adaptively skipped.

Further In accordance with the invention, reference is made to tables compiled during the day, to determine if there have been no OCR coded completed forms processed recently in the system, and if that is the case, the OCR code operations are adaptively skipped.

Further In accordance with the invention, reference is made to tables compiled during the day, to determine if there have been no completed forms processed recently in the system having a significant skew or offset, and if that is the case, the skew and/or offset correction operations are adaptively skipped.

In this manner, the invention minimizes the time required to perform the forms recognition process, by adapting the process sequence to prevailing conditions in the system at the time the completed form is being processed.

DESCRIPTION OF THE FIGURES

These and other objects, features and advantages will be more fully appreciated with reference to the accompanying figures.

FIGS. 2A, 2B and 2C show a flow diagram of the method for constructing a new processing template and form definition data set.

FIGS. 3A, 3B, 3C, 3D, 3E, 3F, 3G, 3H and 3I show various tables which are constructed in accordance with the invention.

FIGS. 4A, 4B, 4C, 4D and 4E show a flow diagram of the method for the form recognition processing sequence management program.

FIG. 5 is a functional block diagram of the forms definition processor and forms recognition processor.

FIGS. 10A and 10B illustrate tables 370 and 380 for a first example.

FIGS. 11A and 11B show tables 370 and 380 for a second example.

FIGS. 12A and 12B show tables 370 and 380 for a third example.

DISCUSSION OF THE PREFERRED EMBODIMENT

Figure 1A:
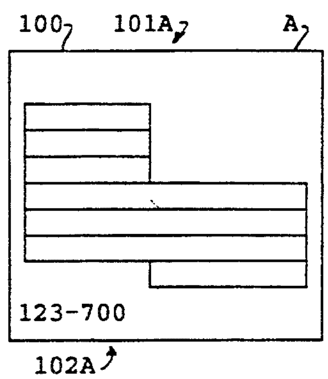
FIGS. 1A, 1B, 1C, 1D, 1E, 1F, 1G and 1H show various examples of master form images.
Figure 1B:
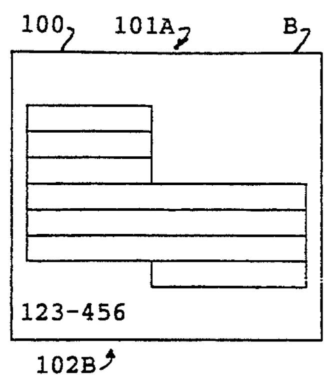
Figure 1C:
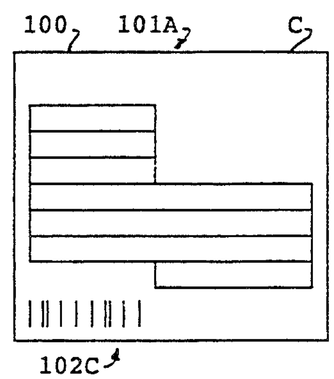
Figure 1D:
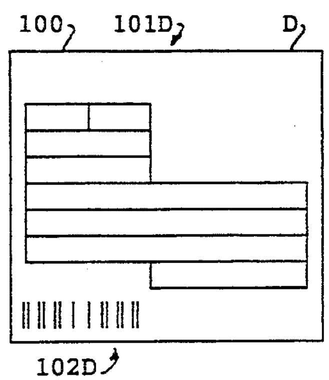
Figure 1E:
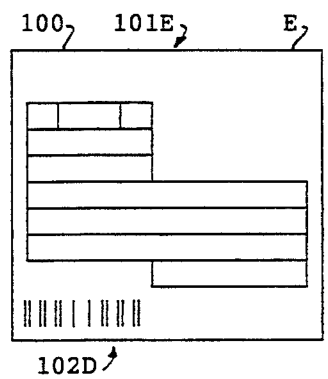
Figure 1F:
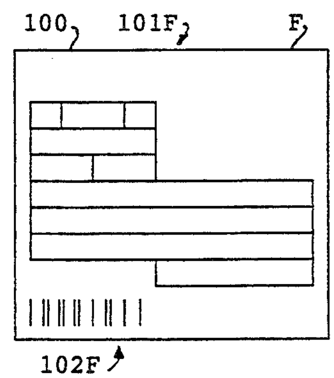
Figure 1G:
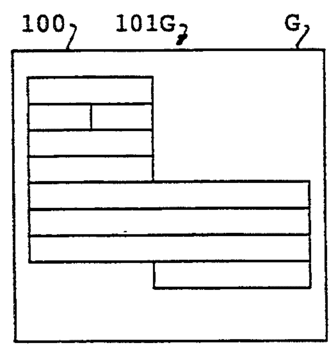
Figure 1H:
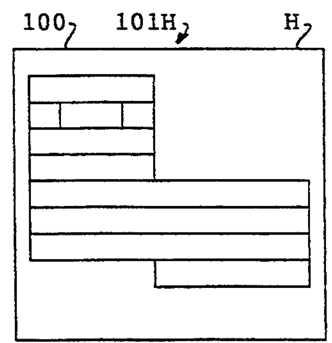

FIGS. 1A–1H show a series of eight example master form images which can be efficiently processed by the forms definition, recognition and verification invention. FIG. 1A show Form A, with the master forms generally referred to as 100, Form A has a line geography 101A and a preprinted OCR code "123-700" 102A. FIG. 1B shows Form B with the same line geography 101A and a different preprinted OCR code 102B. FIG. 1C shows Form C with the same line geography 101A and a preprinted bar code 102C. FIG. 1D shows Form D with a different line geography 101D and bar code 102D. FIG. 1E shows Form E with a different line geography 101E from that of Form D, but the same bar code 102D as that for Form D. FIG. 1F shows Form F with a different line geography 101F and bar code 102F. FIG. 1G shows Form G with a different line geography 101G and no preprinted bar code and no preprinted OCR code. FIG. 1H shows Form H with a different line geography 101H and no preprinted bar code and no preprinted OCR code.

It is seen that in order to perform forms recognition on the eight different master form images of FIGS. 1A–1H, several different types of forms recognition operations need to be used. The most efficient forms recognition operation of bar code location and reading will not work for forms A, B, and it cannot distinguish between Forms D and E, and is useless for Forms G and H. An OCR code location and reading operation is useful for Forms A and B but is useless for Forms C–H. A line geography recognition operation is useless for distinguishing between Forms A, B and C but would be useful in distinguishing between Forms D, E, F, G and H. In accordance with the invention, a default sequence of forms recognition operations is specified. For example, default sequence of form recognition operations may try bar code recognition first, followed by trying OCR code recognition, followed by trying line geography recognition. In accordance with the invention, reference is made to a processing template which is compiled each time a new master form is defined for the system. The processing template will determine if there have been no bar coded master forms to find in the system, and if that is the case, the bar code operations are adaptively skipped and time is not wasted in the futile effort to apply a bar code location and reading operation to completed forms which do not contain such as preprinted indicium. Similarly, if no OCR coded master forms have been defined in the system, then OCR code operations can adaptively be skipped. Once again, this will avoid wasting time attempting to locate and read preprinted OCR indicia if they do not exist in the system. Still further, reference is made to tables compiled during a day of processing completed forms, to determine if there have been no bar coded completed forms processed recently in the system. If that is the case, then an inference can be drawn that it is unlikely to see bar coded forms for the next completed form to be processed. Acting on that inference, the system will then skip bar code operations and avoid wasting the time they require to attempt to locate and read a bar code which is unlikely to be present in the current completed form being processed. Similar adaptive skipping operation can be applied if no OCR coded completed forms have been processed recently.

Figure 3F:
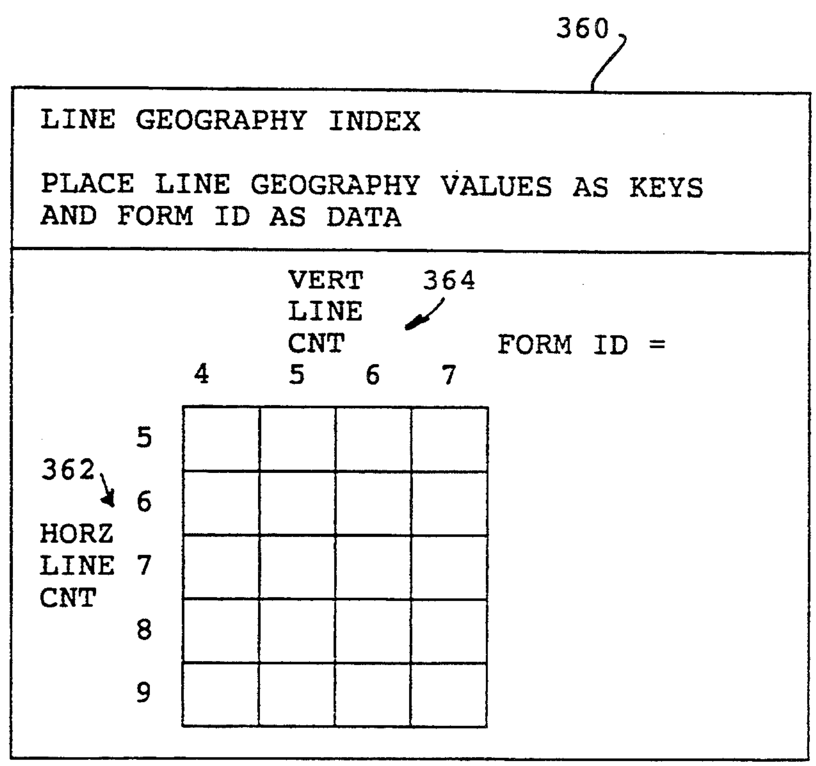

Reference to FIGS. 2A, 2B and 2C will illustrate the method in accordance with the invention. The method 200 is embodied as a program of a sequence of executable instructions. Step 201 begins the method of constructing a new processing template and form definition data set. Reference can be made to FIG. 3A which shows the form definition data set 300. Reference can be made to FIG. 3G which shows a processing template 390, which is made up of a master form population table 320 shown in FIG. 3B, a system conflicts table 330 shown in FIG. 3C, a bar code index 340 shown in FIG. 3D, an OCR code index 350 shown in FIG. 3E, and a line geography index 360 shown in FIG. 3F.

Step 201 of FIG. 2A then flows to step 202 which determines if a new master form is being added to the system and the process goes to step 204. If instead, an old master form is being deleted from the system, then the process flows to step 260. Then the process goes to step 204 which scans in the new master form, which can be one of the forms 100 shown in FIGS. 1A–1H. Then step 206 assigns a new form ID 302. The new form ID is a unique name or number which is assigned to the master form to identify it and distinguish it from all of the master forms in the system. Then step 208 begins the bar code characterization segment. Step 210 performs the bar code location routine on the master form image 100 and obtains a bar code value. The Somerville patent referred to above will describe suitable bar code location and reading routine. Step 211 determines if no bar code is located, then the method goes to the OCR code segment at step 218. However, step 212 determines if a bar code has been found, then increment the master form population table 320 in FIG. 3B for the existence of a bar coded master. This will increment the value BC-CNT in 322 of FIG. 3B. Then place the bar code value from the bar code 102C, for example in FIG. 1C, as a key and then use the form ID as the data in the bar code index 340 of FIG. 3D. The bar code index 340 contains entries at 342 for each bar code value and the corresponding master form ID. Then write the bar code value in the form definition data set 300, as is shown at 304 in FIG. 3A. The process of FIG. 2A then flows to step 214.

Step 214 checks the system conflicts table 330 in FIG. 3C, to determine if any other form ID has the same bar code value. Entry 332 will list any other form ID having the same bar code value. Then step 316 of FIG. 2A determines that if there is another form ID having the same bar code value, then update the system conflicts table. An entry would be made at 332 in FIG. 3C, to indicate that a particular bar code value had two named form IDs, for example. Then step 218 begins the OCR code characterization segment. Step 218 then flows to step 220 which performs the OCR code location on the master form image and obtains the OCR code value. This is a standard technique well-known in the character recognition art for locating preprinted alphanumeric characters in an image and then carrying out a character recognition operation on the character images thus found. Then step 220 flows to step 221 which determines if no OCR code has been located in the master form image, such as the absence of OCR code 102A in FIG. 1A for example, then the method goes to the line geography segment at 230. In step 222, alternately if the OCR code has been found, such as is shown for the code 102A in FIG. 1A, then the master form population table 320 of FIG. 3B is incremented for the existence of an OCR coded master. Entry 342 of FIG. 3B would be incremented at the value OC-CNT. Then place the OCR code value as the key and place the form ID as the data in the OCR code index 350 of FIG. 3E. The index 350 of FIG. 3E has the entry 352 which contains the OCR code value and the corresponding form ID for all of the OCR coded master forms defined in the system. Then write the OCR code value in the form definition data set 300 at entry 306 of FIG. 3A.

The flow diagram of FIG. 2A then goes to step 224 in FIG. 2B which checks the system conflicts table 330 for any other form ID having the same OCR code value. Entry 334 of the system conflicts table lists any other form ID having the same OCR code value. Then step 226 determines if there is another form ID having the same OCR code value, and if there is, then update the system conflicts table at entry 334 to indicate the OCR code value and the corresponding names of the form Ids which have that value.

Figure 6F:
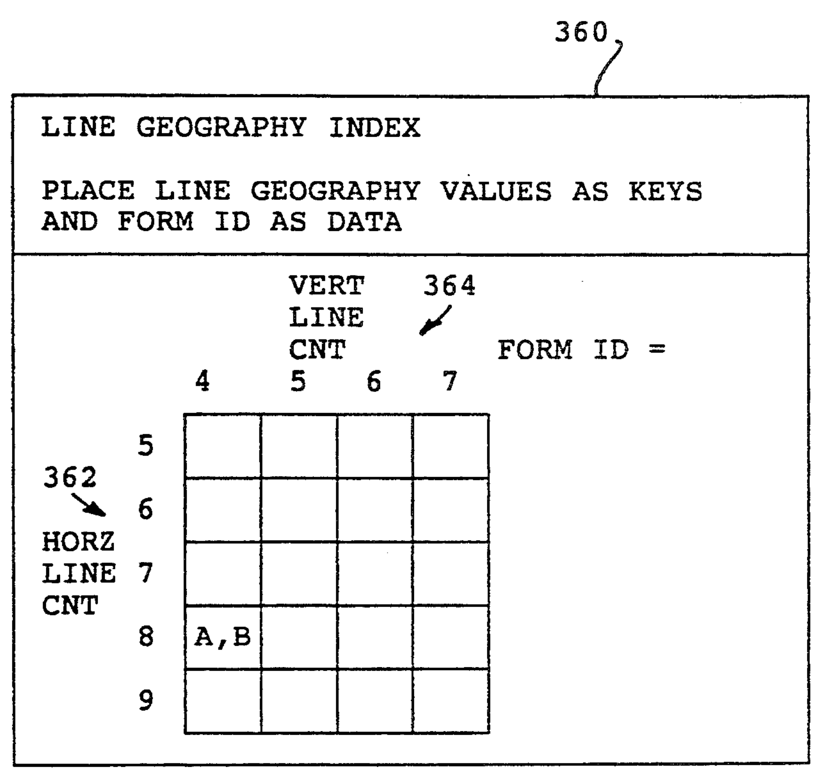
FIGS. 6A(A), 6A(B), 6B, 6C, 6D, 6E and 6F illustrate the configuration of the tables for Form A and Form B, in accordance with the invention.

Then the method flows to step 230 which begins the line geography characterization segment. Step 232 performs the line geography routine on the master form image 100 to obtain line geography values. For example, FIG. 1A has Form A with the line geography 101A that contains eight horizontal lines and four vertical lines. Reference can be made to FIG. 6A(A) for the line geography values at entry 308 indicating the characterization of the line geography 101A. Step 334 places the line geography values as the key and the master form ID as the data in the line geography index 360 of FIG. 3F. The line geography index 360 can be shown as the example of FIG. 3F, if the line geography characterization is the number of horizontal lines and the number of vertical lines, then the line geography index can be a two-dimensional index with horizontal line count 362 as a first key and vertical line count 364 as a second key, with the form ID as the value contained within the two-dimensional table. For example, if the Form A in FIG. 1A has eight horizontal lines and four vertical lines, then the line geography index 360 is shown in FIG. 6F with the entry A in the first column, fourth row of the two-dimensional index of FIG. 6F. More complex shape matching indices are possible for more complex line geography characterizations.

Step 234 places line geography values as the key and the form ID as the data in the line geography index 360 of FIG. 3F. It then writes the line geography values in the form definition data set 300 of FIG. 3A, at entry 308. An example of the characterization for the Form A of FIG. 1A is shown in the form definition data set 300A of FIG. 6A(A). Then the method flows to step 236 which checks the system conflicts table 330 of FIG. 3C for any other form ID having the same line geography values. Entry 336 of FIG. 3C will contain any other form ID having the same line geography values. Then the method flows to step 338 which determines if there is another form ID having the same line geography values, then it updates the system conflicts table.

An additional feature of forms recognition processing is the characterization of skew and the offset of a completed form image, so that error information can be provided to later processing stages such as the field extraction stage and a field character recognition stage. Step 242 of FIG. 2B prepares the form definition data set with sufficient information to enable the skew and offset correction process. The master form will have horizontal alignment lines and vertical alignment lines contained in it as a part of its line geography. Step 242 locates the horizontal alignment line and vertical alignment line and writes the coordinates of these lines as master alignment lines in the form definition data set 300 at entry 310. An example of this for the Form A in FIG. 1A is shown in the form definition data set 300A in FIG. 6A(A) at entry 310.

The method of FIG. 2B then flows to step 244 which begins the fields definition segment. The method flows to step 246 which performs a field definition routine. This routine would typically be an interactive process with the user using a mouse pointing device, for example, and the keyboard, to specify particular fields on an image of the master form so that the coordinates of the specified field can be stored and permits the user to enter additional information such as the expected font or character type which will be filled in a completed form in that particular field. Then step 248 writes the field definitions and the form definition data set in the entry 312, as shown in FIG. 3A.

Then, in accordance with the invention, the method of FIG. 2B then flows to step 250 in FIG. 2C, which assembles a new processing template 390, as is shown in FIG. 3G. The new processing template 390 will include the master form population table 320, the system conflicts tables 330, the bar code index 340, the OCR code index 350, and the line geography index 360. The new processing template 390 will characterize the profile of all of the master forms currently defined in the system, including the most recently defined form as represented by the form definition data set 300. Then step 252 outputs the new processing template 390 and the form definition data set 300 to the forms recognition processor 850 as shown in the block diagram of FIG. 5. The method of FIG. 2C then returns to the main program at step 254.

In FIG. 2A, if step 202 determines that instead of adding a new master form, the user wishes to delete an old master form, then the method flows to step 260 in FIG. 2C. In step 260 the deletion of the master form segment, the program flows to step 262 which inputs the old ID of the old master form to be deleted. Then step 264 removes all references to the old ID of the old master form in the master form population table 320, the system conflicts table 330, the bar code index 340, the OCR code index 350, and the line geography index 360. Then the program flows to step 266 which assembles a new processing template 390 which includes the updated master form population table 320, system conflicts table 330, bar code index 340, OCR code index 350, and line geography index 360. Then step 268 outputs the new processing template 390 to the forms recognition processor 850. The program then returns to the main program at step 270. Thus it is seen, that each time a change is made in the profile of all of the master forms defined in the system, a new processing template 390 is constructed in method 200, and distributed to the forms recognition processor 850.

Reference can be made to FIG. 6A(A) which shows a form definition data set 300A which characterizes the master Form A of FIG. 1A. Similarly, FIG. 6A(B) shows a form definition data set 300B which characterizes the Form B shown in FIG. 1B. FIGS. 6B, 6C, 6D and 6E and 6F show the master form population table 320, the system conflicts table 330, the bar code index 340, OCR coded index 350, and the line geography index 360 in the state after having defined the first two Forms A and B.

Figure 7F:
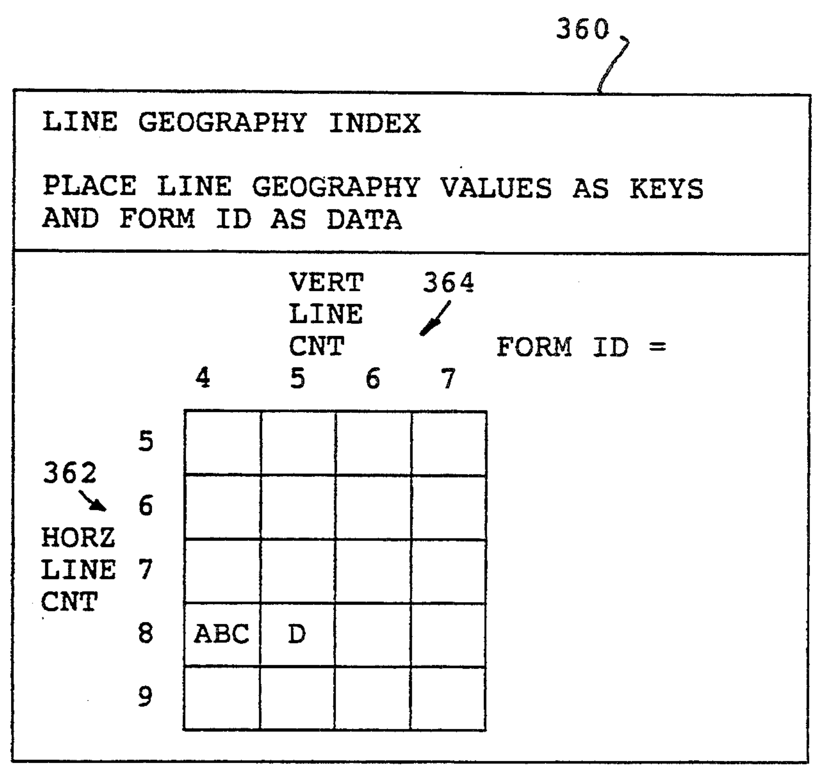
FIGS. 7A(C), 7A(D), 7B, 7C, 7D, 7E and 7F illustrate the configuration of the tables for Form C and Form D, in accordance with the invention.

FIG. 7A(C) and FIG. 7A(D) show the form definition data sets 300C and 300D, respectively, which characterize the Forms C and D respectively of FIGS. 1C and 1D, respectively. FIGS. 7B, 7C, 7D, 7E and 7F show the state the master form population table 320, the system conflicts table 330, the bar code index 340, the OCR code index 350 and the line geography index 360 after four master forms have been defined in the system, Forms A, B, C and D.

Figure 8F:
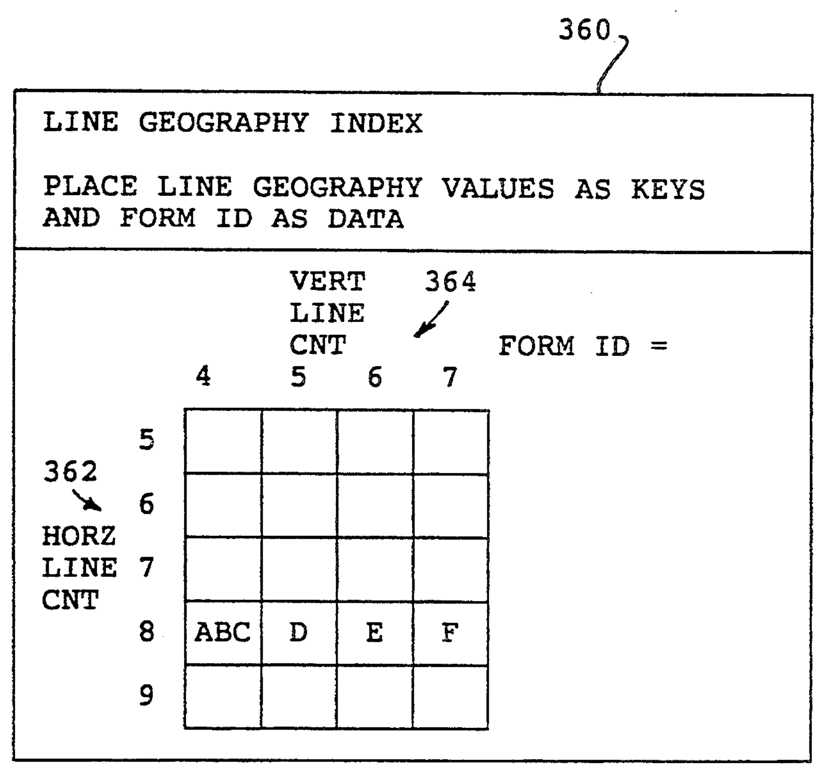
FIGS. 8A(E), 8A(F), 8B, 8C, 8D, 8E and 8F illustrate the configuration of the tables for Form E and Form F, in accordance with the invention.

FIG. 8A(E) and FIG. 8A(F) show the form definition data sets 300E and 300F respectively, which characterize the Forms E and F respectively, shown in FIGS. 1E and 1F respectively. FIG. 8B, 8C, 8D, 8E and 8F show the master form population table 320, the system conflicts table 330, the bar code index table 340, the OCR code index 350 and the line geography index 360, in the state after the definition of six master form images, A, B, C, D, E and F.

Figure 9F:
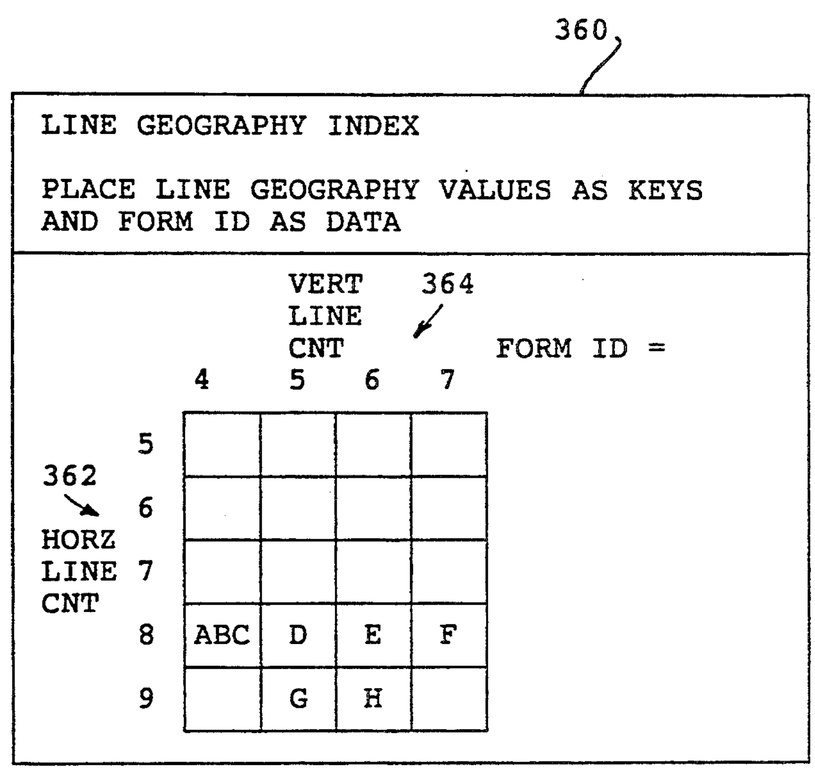
FIGS. 9A(G), 9A(H), 9B, 9C, 9D, 9E and 9F illustrate the configuration of the tables for Form G and Form H, in accordance with the invention.

FIG. 9A(G) and FIG. 9A(H) show form definition data sets 300G and 300H respectively, which characterize the master form images G and H respectively, of the FIGS. 1G and 1H respectively. FIGS. 9B, 9C, 9D, 9E and 9F show the master form population table 320, the system conflicts table 330, the bar code index 340, the OCR code index 350 and the line geography index 360 respectively, for the state after defining eight master form images A, B, C, D, E, F, G and H to the system.

Thus it is seen that by operation of the method 200 shown in FIGS. 2A–2C, eight different master form images can be defined to the system which will produce a succession of eight form definition data sets and one final processing template 390 which summarizes the final state the tables and indices characterizing the profile of those eight master forms which have been defined in the system. The eight form definition data sets 300 and the latest processing template 390 are sent to the forms definition processor 850.

Reference can be made to FIG. 5 which shows the forms definition processor 800 which carries out the method 200 of FIGS. 2A–2C. The form definition processor 800 includes the memory 802 which is connected by the bus 815 to the CPU 810, scanner 812, disk drive 814, local area network adaptor 816, keyboard and display 18, and mouse pointing device 820. The memory 802 includes the form definition data set building program 200, the master form image partition 600, the bar code location reading routine 602, tables and index partitions 604, form definition data set partition 606, OCR code location reading routine 608, line geography values generation routine 610, alignment lines generation routine 612, field definition routine 614, document image handling program 616 and operating system program 618. All programs stored in the memory 802 are sequences of executable instructions, which, when executed in the CPU 810, perform the intended operations. The LAN adaptor 816 connects to the LAN 845 which in turn connects to the LAN adaptor 876 of the forms recognition processor 850. Also connected to the local area network 845 is the field extraction processor 900 and the character recognition processor 950.

After the master form images 100 have been defined to the system, forms recognition operations can be applied to completed form images received by the system. The method 400 of FIGS. 4A–4E will carry out the recognition processing sequence program. Step 401 begins the form recognition processing sequence program, which flows to step 402 which loads the latest processing template 390 into the forms recognition processor 850. Then step 404 scans in a completed form and sets the value of "retry" equal to two. Then step 406 begins the bar code location segment. Step 408 checks the master form population table 320 in the processing template 390, for the existence of any bar coded masters. Step 410 determines if there are no bar coded masters in the system, then the system goes to the OCR code location segment at 446. This would be the case if only Forms A and B had been defined to the system, as set forth in FIGS. 6B. Step 410, if no bar coded master are found, then go to the OCR code location segment at 446. Then step 412 checks the recently processed completed form population table 370 of FIG. 3H for the existence of any bar coded completed forms. The recently processed completed form population table 370 is updated to reflect the number of bar coded completed forms that have been recently processed. This entry is made at 372 of FIG. 3H. Table 370 also updates for the existence of any OCR coded completed forms at entry 374. These are forms which have been processed as completed forms during the same processing day, for example. The inference is drawn that if no bar coded forms have been processed recently, then the probability is low that the next form to be processed will be a bar coded form. Step 414 of FIG. 4A determines if no bar coded completed forms have been recently processed, then go to the OCR code location segment at 446. Then step 416 performs the bar code location routine on the completed form. Step 418 determines if no bar code has been located or if there is a bar code reading error, then update the recently processed completed form population table 370 of FIG. 3H by decrementing the number of bar coded completed forms recently processed. For example, every time a bar coded completed form is processed, the entry 372 is incremented by one. Alternately, every time a completed form is processed which does not contain a bar code, then entry 372 is decremented. In this manner, if a series of completed forms are processed which do not contain preprinted bar codes, the entry RB-CNT of 372 will ultimately go to zero. Step 418 will go to the OCR code location segment 446 if no bar code has been located. Alternate statistical compilation techniques can also be employed.

In step 420, if a bar code has been located, then get the bar code value. Then step 422 accesses the bar code index 340 of FIG. 3D using the bar code value, to obtain the form ID. If no form ID is found, then go to the OCR code location segment 446. Step 424 checks the system conflicts table 330 for any form ID having the same bar code value. Step 246 determines if there is another form ID having the same bar code value, then go to the OCR code location segment 446. Step 428 determines if no other form ID has the same bar code value, then use the form ID to access the form definition data set 300 corresponding to the form ID. Then step 410 updates the recently processed completed form population table 370 of FIG. 3H, to increment the number of bar coded completed forms recently processed at the entry 372. Then step 432 goes to the adaptive skew and offset correction segment at 492. FIG. 4B shows the OCR code location segment which goes from steps 446, 448,450, 452, 454, 456, 458,460, 462, 464, 466, 468, 470 to 472, performing similar operations to those described for the bar code location segment discussed above, but in conjunction with OCR coded completed forms. It is seen that in accordance with the invention, the time required to perform the forms processing process can be minimized by adapting the process sequence to the prevailing conditions in the system at the time the completed form is being processed.

The method then flows to step 476 in FIG. 4C to begin the line geography segment. Step 477 performs the line geography routine and step 478 determines if no line geography is located, then go to the error reporting segment at 510. Step 480 determines if the line geography has been located, then get the line geography value. Step 482 accesses the line geography index using the line geography value to obtain the form ID. The line geography index 360 will contain the form IDs corresponding to horizontal line count and vertical line count for the particular completed form being processed, as described above. Corresponding form ID is then returned by the line geography index 360. Then step 484 checks the system conflicts table 330 in FIG. 3C at entry 336, for any other form ID having the same line geography value. Step 486 determines if there is another form ID having the same line geography value, then go to the error reporting segment at 510. Step 488 determines if there is no other form ID having the same line geography value, then use the form ID to access the form definition data set corresponding to the completed form. Then step 490 goes to the adaptive skew and offset correction segment at 492.

FIG. 4D of method 400 begins the adaptive skew and offset correction segment at step 492. Step 494 checks the recently processed completed form skew and offset table 380 of FIG. 3I, for the number of recently completed forms that have skew or offset values greater than a predetermined threshold value. If the scanned image of the completed document is misregistered, then it will have either a skew or an offset error. This is many times the function of a particular scanning device being used to scan in the completed forms or alternately a function of the technique of the operator feeding hard copy documents to the scanning device. Step 496 determines if there are no completed forms recently processed that have a skew or offset greater than the predetermined threshold value. This information is compiled for each form processed during a processing day, and entered at 382 of table 880 of FIG. 3I. Optionally, the threshold value can also be included at 384, and a state referred to as the skew/offset state can also be provided at 386 in FIG. 31. In step 496, if there are no completed forms recently processed that have skew or offset greater than the threshold value, then set the skew/offset state equal to zero and output a skew value of zero and an offset value of zero to the field extraction processor 900 of FIG. 5. In this manner, the lengthy process of measuring the skew and offset error can be skipped for a currently processed completed form, if there are no recently processed completed forms that have had skew or offset errors. Step 496 then updates the recently processed completed form skew and offset table 380 of FIG. 31 at entry 382, if the skew offset state is set to zero that is updated in entry 386.

Step 498 alternately determines if there are completed forms recently processed that have skew or offset errors greater than the predetermined threshold value, and if there are, then the skew/offset state is set equal to one at 386 in FIG. 31. In step 499, if the skew/-offset error signal received from the field extraction processor 900 over the LAN 845 or from the character recognition processor 950 over the LAN 845 indicates that there has been a skew or offset error which has been identified by those later processing stages, then set the skew/offset state equal to one at 386 of FIG. 3I.

Then step 500 gets the master alignment lines information at 310 from the form definition data set 300 of FIG. 3A. Then step 502 performs the skew and offset correction on the scanned in form using the master alignment lines, to obtain the skew and offset value. Step 504 determines if the skew or offset value is greater than the predetermined threshold, and if it is, then increment the recently processed completed form skew offset table 380 in FIG. 3I at 382, for the number of recently completed forms that have skew or offset errors greater than the threshold value. Thus the variable SK-CNT at 382 in FIG. 3I will be incremented by one if the currently processed completed form has the skew or offset error. In step 506, if the skew or offset value is less than the predetermined threshold, then decrement the recently processed completed form skew and offset table 380 in FIG. 3I at 382, for the number of recently completed forms that has skew or offset greater than the threshold value. Thus the currently processed completed form does not have a skew and offset values which are greater than the threshold value, then decrement the SK-CNT variable by one. Eventually, if a series of consecutive completed forms do not have skew or offset values greater than the threshold, the value of SK-CNT in FIG. 3I will go to zero. At that time, subsequently processed completed forms will have the inference drawn that they do not have a skew or an offset error because the preceding series of forms did not have such errors. In response to this the lengthy process of computing the skewing and offset set errors will be skipped for that form being processed. At a later time, if the succeeding stages of field extraction in the processor 90) and character recognition in the processor 950 determine that there are in fact skew or offset errors, this information will be fed back to the forms recognition processor 850 to have step 499 reset the skew/offset stage equal to one again. If the skew or offset state 386 is set equal to one, the SK-CNT value in 382 can be incremented to force the next few forms processed to have the skew and offset correction procedure executed. Alternate statistical compilation techniques can also be employed.

After a skew and offset error value have been computed in the adaptive skew and offset correction procedure of FIG. 4D, step 508 outputs the skew value and the offset value to the field extraction stage 900 and the character recognition stage 950. Then step 509 returns to the main program.

FIG. 4E shows the error reporting segment which begins at step 510 and flows to step 512 which determines if line geography failure has occurred and the value of "retry" is equal to two, then set "retry" equal to one and go to the bar code location segment at step 416. This will retry a bar code location and reading procedure to determine if a valid bar code can be identified for the form. The procedure then flows to step 514 which determines if a line geography failure has occurred and the "retry" equals one, then set "retry" equal to zero and go to the OCR code location segment at step 456. This will retry the OCR code process to determine if it can successfully identify an OCR preprinted code on the form. Then the process flows to step 516 which determines if a line geography failure has occurred and the value "retry" equals to zero, then an error is reported. The program then flows to step 5 18 which returns to the main program.

The method 400 for form recognition processing sequence management of FIGS. 4A–4E is embodied as a sequence of program instructions which, when executed, carry out the method 400. The forms recognition processor shown in FIG. 5 stores the program 400.

The forms recognition processor 850 of FIG. 5 includes a memory 852, which is connected by means of the bus 875 to the LAN adaptor 876, the disk drive 874, the scanner 872 and the CPU 870, and the keyboard and display 878 and the mouse pointing device 880. The LAN adaptor 876 is connected to the LAN 845 and receives from the forms definition processor 800, the processing template 390 and the form definition data set 300, in accordance with the invention. The memory 852 includes the form recognition processing sequence program 400, the completed form image partitioning 650, the processing template and tables 652, the bar code location and reading routine 654, the form ID 656, the form definition data set partition 658, the OCR code location reading routine 660, the line geography values generation routine 652, the skew and offset correction routine 664, the error reporting routine 666, the document image handling program 668 and the operating system 670. All other programs stored in the memory 852 are sequences of executable instructions, which, once executed by the CPU 870, perform the intended operations.

Reference can be made to FIGS. 10A and 10B which show a first example of the state of the recently processed completed form population table 370 and the state of the recently processed completed form skew and offset table 380, at a first instance. Entry 372 shows that the value RB-CNT equals 30 which means that there have been 30 bar coded completed forms which have been recently processed. The entry 374 shows the variable RB-CNT equal to 20 which indicates that there have been 20 OCR completed forms which have been recently processed. In this state for the table 370 of FIG. 10A, when a particular completed form is being processed by the method 400 of FIG. 4A, when step 414 determines that there have been recently processed bar coded forms, then the program will flow to step 416 to perform bar code location routine for the currently processed form. However, the example in FIG. 11A shows entry 372 having a value RB-CNT equal to zero, which means that there have been no recently processed forms which are bar coded. For the example of FIG. 11A, step 414 of FIG. 4A will cause the method to skip step 416, avoiding the lengthy computation of the bar code location routine. Instead, the program will go to the OCR code location segment at 446. A similar comment can be made concerning the entry 374 of FIG. 10A which shows there are 20 OCR completed forms recently processed. Compare that with a second example in FIG. 11A where 374 shows there are no OCR completed forms recently processed. In this case, the method 400, when processing a particular form, will execute step 454 differently, depending on the example. In the example of FIG. 10A, since there are recently OCR completed forms, step 454 will flow to step 456 and the OCR location routine will be performed. In the second example of FIG. 11A, since there are no recent OCR completed forms, step 454 will flow to the line geography segment at 476, thereby skipping the lengthy procedure of performing an OCR code location and reading.

Reference can be made to the examples shown in FIG. 11B and FIG. 12B for the recently processed completed form skew and offset table 380. In the second example shown in FIG. 11B, entry 382 shows SK-CNT value equals a 10 which means there are 10 recently processed forms that had a skew or offset error created on the threshold value. In the third example of FIG. 12B, the entry 382 shows SK-CNT equal to zero, which means there are no recently processed forms that have a skew or offset value greater than the threshold value. Thus, when the method 400 of FIG. 4D is processing a particular form, step 496 will be executed in two different ways. For the second example of FIG. 11B, since there are recently processed forms having a skew or offset error, step 496 will flow to step 498, 499 and 500 to perform skew and offset correction at 502. Alternately, in the third example of FIG. 12B, since there are no recent forms that have a significant skew or offset error, step 496 will skip the lengthy computation of skew and offset errors.

Thus it is seen that the invention minimizes the time required to perform the form recognition process, by adapting the process sequence to prevailing conditions in the system at the time the completed forms are being processed.

The invention can be expanded to other recognition characteristics of a form, such as the existence and positioning of fiducial registration marks, the existence of other characterizing marks on the form being processed.

Although a specific embodiment of the invention has been disclosed, it will be understood by those having skill in the art, that changes can be made to that specific embodiment without departing from the spirit and the scope of the invention.

For example the system shown in FIG. 5 can be embodied in a single multi-tasking processor instead of several separate processors interconnected by a local area network.

What is claimed is:

1. In a data processing system, a method for performing forms recognition of document forms, comprising the steps of:

inputting a first master form image having a first bar code, a first line geography, and first field regions to said data processing system, and assigning a first form identification thereto;

generating tables indicative of prior completed document form images processed by the system using the first master form image;

locating said first bar code in said first master form image and obtaining a first bar code value therefrom;

generating a bar code index in said data processing system with said first bar code value and said first form identification;

writing said first bar code value in a first form definition data set;

characterizing said first line geography in said first master form image and obtaining a first line geography value therefrom;

generating a line geography value index in said data processing system using said first line geography value and said first form identification;

writing said first line geography value in said first form definition data set;

writing first field definitions for said first field regions in said first form definition data set;

inputting a second master form image having a second line geography and second field regions to said data processing system, and assigning a second form identification thereto;

generating tables indicative of prior completed document form images processed by the system using the second master form image;

characterizing said second line geography in said second master form image and obtaining a second line geography value therefrom;

further generating said line geography value index in said data processing system using said second line geography value and said second form identification;

writing said second line geography value in a second form definition data set;

writing second field definitions for said second field regions in said second form definition data set;

inputting a completed document form image having a defined line geography and defined field regions, to said data processing system;

searching for a bar code in said completed document form image;

accessing said bar code index in said data processing system if a bar code has been found in said search, to obtain a completed form identification;

accessing said first form definition data set using said completed form identification, if a bar code has been found in said search;

outputting said first form definition data set to a field processing means, to process data within said defined field regions of said completed form image, if a bar code has been found in said search;

alternatively performing the following steps in lieu of the step above and thereafter of accessing the bar code index;

checking and updating the tables for the first master form image;

characterizing said defined line geography in said completed form image and obtaining a defined line geography value therefrom, if a bar code has not been found in said search;

accessing said defined line geography value index in said data processing system, to obtain a completed form identification, if a bar code has not been found in said search;

accessing said second form definition data set using said completed form identification, if a bar code has not been found in said search; and outputting said second form definition data set to a field processing means, to process data within said defined field regions of said completed form image, if a bar code has not been found in said search.

2. The method of claim 1, which further comprises:

generating a master form population table for any bar coded master form image before the step of inputting the first master form image;

before said searching step, determining from said master form population table that bar coded master forms exist in said system, and skipping said searching step in response to such a determination.

3. The method of claim 1, which further comprises:

generating a completed form population table for any recently processed bar coded completed forms before the step of inputting the first master form image;

before said searching step, determining from said completed form population table that there have been no recently processed bar coded completed forms in said system, and skipping said searching step in response to such a determination.

4. The method of claim 1, which further comprises:

generating a completed form skew/offset table for any recently processed completed forms having a skew/-offset greater than a predetermined threshold before the step of inputting the first master form image;

before said outputting step, determining from said completed form skew/offset table that there has been a recently processed completed form in said system having a skew/offset greater than said predetermined threshold, and in response to such a determination, performing a skew/offset correction of said completed form image.

5. The method of claim 1, which further comprises:

generating a completed form skew/offset table for any recently processed completed forms having a skew/-offset greater than a predetermined threshold before the step of inputting the first master form image; before said inputting step, determining from said completed form skew/offset table that there has been no recently processed completed form in said system having a skew/offset greater than said predetermined threshold, and in response to such a determination, skipping performing a skew/offset correction of said completed form image.

6. In a data processing system, a method for performing forms recognition of document forms, comprising the steps of:

inputting a first master form image having a first OCR code, a first line geography, and first field regions to said data processing system, and assigning a first form identification thereto;

generating tables indicative of prior completed document form images processed by the system using the first master form image;

locating said first OCR code in said first master form image and obtaining a first OCR code value therefrom;

constructing a OCR code index in said data processing system with said first OCR code value and said first form identification;

writing said first OCR code value in a first form definition data set;

characterizing said first line geography in said first master form image and obtaining a first line geography value therefrom;

generating a line geography value index in said data processing system using said first line geography value and said first form identification;

writing said first line geography value in said first form definition data set;

writing first field definitions for said first field regions in said first form definition data set;

inputting a second master document form image having a second line geography and second field regions to said data processing system, and assigning a second form identification thereto;

generating tables indicative of prior completed document form images processed by the system using the second master form image;

characterizing said second line geography in said second master form image and obtaining a second line geography value therefrom;

further generating said line geography value index in said data processing system using said second line geography value and said second form identification;

writing said second line geography value in a second form definition set;

writing second field definitions for said second field regions in said second form definition data set;

inputting a completed document form image having a defined line geography and defined field regions, to said data processing system;

searching for a OCR code in said completed form image;

accessing said OCR code index in said data processing system if a OCR code has been found in said search, to obtain a completed form identification;

accessing said first form definition data set using said completed form identification, if a OCR code has been found in said search;

outputting said first form definition data set to a field processing means, to process data within said defined field regions of said completed form image, if a OCR code has been found in said search;

alternatively performing the following steps in lieu of the step above and thereafter of accessing the OCR code index:

checking and updating the tables for the first master form image;

characterizing said defined line geography in said completed form image and obtaining a defined line geography value therefrom, if a OCR code has not been found in said search;

accessing said line geography value index in said data processing system, to obtain a completed form identification, if a OCR code has not been found in said search;

accessing said second form definition data set using said completed form identification, if a OCR code has not been found in said search;

outputting said second form definition data set to a field processing means, to process data within said defined field regions of said completed form image, if a OCR code has not been found in said search.

7. The method of claim 6, which further comprises:

generating a master form population table for any OCR coded master forms image before the step of inputting the first master form image;

before said search step, determining from said master form population table that OCR coded master forms exist in said system, and skipping said searching step in response to such a determination.

8. The method of claim 6, which further comprises:

generating a completed form population table for any recently processed OCR coded completed form image before the step of inputting the first master form image;

before said searching step, determining from said completed form population table that there have been no recently processed OCR coded completed forms in said system, and skipping said searching step in response to such a determination.

9. The method of claim 6, which further comprises:

generating a completed form skew/offset table for any recently processed completed forms having a skew/offset greater than a predetermined threshold before the step of inputting the first master form image;

before said outputting step, determining from said completed form skew/offset table that there has been a recently processed completed form in said system having a skew/offset greater than said predetermined threshold, and in response to such a determination, performing a skew/offset correction of said completed form image.

10. The method of claim 6, which further comprises:

generating a completed form skew/offset table for any recently processed completed forms having a skew/offset greater than a predetermined threshold before the step of inputting the first master form image;

before said outputting step, determining from said completed form skew/offset table that there has been no recently processed completed form in said system having a skew/offset greater than said predetermined threshold, and in response to such a determination, skipping performing a skew/offset correction of said completed form image.

11. In a data processing system, an apparatus for performing forms recognition of document forms, comprising:

means for inputting a first master form image having a first bar code, a first line geography, and first field regions to said data processing system, and assigning a first form identification thereto;

means for generating tables indicative of prior completed document form images processed by the system using the first master form image;

means for locating said first bar code in said first master form image and obtaining a first bar code value therefrom;

means for generating a bar code index in said data processing system with said first bar code value and said first form identification;

means for writing said first bar code value in a first form definition data set;

means for characterizing said first line geography in said first master form image and obtaining a first line geography value therefrom;

means for constructing a line geography value index in said data processing system with said first line geography value and said first form identification;

means for writing said first line geography value in said first form definition data set;

means for writing first field definitions for said first field regions in said first form definition data set;

means for inputting a second master form image having a second line geography and second field regions to said data processing system, and assigning a second form identification thereto;

means for generating tables indicative of prior completed document form images processed by the system using the second master form image;

means for characterizing said second line geography in said second master form image and obtaining a second line geography value therefrom;

means for further generating said line geography value index in said data processing system with said second line geography value and said second form identification;

means for writing said second line geography value in a second form definition data set;

means for writing second field definitions for said second field regions in said second form definition data set;

means for inputting a completed document form image having a defined line geography and defined field regions, to said data processing system;

means for searching for a bar code in said completed form image;

means for accessing said bar code index in said data processing system if a bar code has been found in said search, to obtain a completed form identification;

means for accessing said first form definition data set using said completed form identification, if a bar code has been found in said search;

means for outputting said first form definition data set to a field processing means, to process data within said defined field regions of said completed form image, if a bar code has been found in said search;

means for alternatively activating the following means after the means for searching for a bar code in said completed image:

checking and updating the tables for the first master form image;

means for characterizing said defined line geography in said defined form image and obtaining a completed line geography value therefrom, if a bar code has not been found in said search;

means for accessing said line geography value index in said data processing system, to obtain a completed form identification, if a bar code has not been found in said search;

means for accessing said second form definition data set using said completed form identification, if a bar code has not been found in said search;

means for outputting said second form definition data set to a field processing means, to process data within said defined field regions of said completed form image, if a bar code has not been found in said search.

12. The apparatus of claim 11, which further comprises: means for generating a master form population table for any bar coded master forms for use with the master form image;

means for determining from said master form population table that bar coded master forms exist in said system, and skipping said searching step in response to such a determination.

13. The apparatus of claim 11, which further comprises:

means for generating a completed form population table for any recently processed bar coded completed forms for use with the master form image;

means for determining from said completed form population table that there have been no recently processed bar coded completed forms in said system, and skipping said searching step in response to such a determination.

14. The apparatus of claim 11, which further comprises:

means for generating a completed form skew/offset table for any recently processed completed forms having a skew/offset greater than a predetermined threshold for use with the master form image;

means for determining from said completed form skew/offset table that there has been a recently processed completed form in said system having a skew/offset greater than said predetermined threshold, and in response to such a determination, performing a skew/offset correction of said completed form image.

15. The apparatus of claim 11, which further comprises:

means for generating a completed form skew/offset table for any recently processed completed forms having a skew/offset greater than a predetermined threshold for use with the master form image;

means for determining from said completed form skew/offset table that there has been no recently processed completed form in said system having a skew/offset greater than said predetermined threshold, and in response to such a determination, skipping performing a skew/offset correction of said completed form image.

* * * * *